(12) United States Patent
Kawashima

(10) Patent No.: US 8,277,973 B2
(45) Date of Patent: Oct. 2, 2012

(54) NONAQUEOUS ELECTROLYTE COMPOSITION AND NONAQUEOUS ELECTROLYTE SECONDARY BATTERY

(75) Inventor: Atsumichi Kawashima, Fukushima (JP)

(73) Assignee: Sony Corporation, Tokyo (JP)

( * ) Notice: Subject to any disclaimer, the term of this patent is extended or adjusted under 35 U.S.C. 154(b) by 1054 days.

(21) Appl. No.: 11/763,233

(22) Filed: Jun. 14, 2007

(65) Prior Publication Data

US 2008/0206649 A1    Aug. 28, 2008

(30) Foreign Application Priority Data

Jun. 16, 2006 (JP) ................................ 2006-167226
Aug. 14, 2006 (JP) ................................ 2006-220808

(51) Int. Cl.
*H01M 6/16* (2006.01)
*H01M 10/0565* (2010.01)
*H01M 10/0566* (2010.01)
*H01M 10/0567* (2010.01)
*H01M 10/0568* (2010.01)
*H01M 10/0569* (2010.01)

(52) U.S. Cl. ......... 429/203; 429/300; 429/340; 429/341

(58) Field of Classification Search .......... 429/400–535, 429/122–347
See application file for complete search history.

(56) References Cited

U.S. PATENT DOCUMENTS

| | | | | |
|---|---|---|---|---|
| 4,774,011 A | * | 9/1988 | Mori et al. .................... | 252/62.2 |
| 5,460,904 A | * | 10/1995 | Gozdz et al. .................. | 429/316 |
| 6,096,447 A | | 8/2000 | Gan et al. | |
| 6,124,060 A | * | 9/2000 | Akita et al. ................... | 429/307 |
| 6,136,471 A | * | 10/2000 | Yoshida et al. ............ | 429/218.1 |
| 6,200,701 B1 | * | 3/2001 | Gan et al. ...................... | 429/203 |
| 6,544,685 B2 | | 4/2003 | Kim et al. | |
| 6,641,957 B1 | * | 11/2003 | Kawaguchi et al. .......... | 429/324 |
| 6,670,078 B1 | * | 12/2003 | Sato et al. ..................... | 429/340 |
| 2003/0165733 A1 | * | 9/2003 | Takehara et al. .............. | 429/101 |
| 2003/0190529 A1 | * | 10/2003 | Kim et al. ..................... | 429/307 |
| 2004/0126658 A1 | | 7/2004 | Otsuki et al. | |
| 2006/0078764 A1 | * | 4/2006 | Yang et al. ..................... | 429/12 |

FOREIGN PATENT DOCUMENTS

| | | |
|---|---|---|
| JP | 60-23973 | 2/1985 |
| JP | 4-332479 | 11/1992 |
| JP | 6-22128 | 3/1994 |
| JP | 7-153487 | 6/1995 |

(Continued)

OTHER PUBLICATIONS

Yoshihisa et al. JP 11-238513. Aug. 31, 1999. English Machine Translation provided by JPO.*

*Primary Examiner* — Basia Ridley
*Assistant Examiner* — James Lee
(74) *Attorney, Agent, or Firm* — K&L Gates LLP

(57) ABSTRACT

A nonaqueous electrolyte composition containing an electrolyte salt, a nonaqueous solvent and a compound having a phosphorus-hydrogen bond or a phosphorus-carbon bond is provided. Also provided is a nonaqueous electrolyte secondary battery including: a cathode and an anode having a material capable of occluding and releasing lithium ions as a cathode active material and an anode active material, respectively; a nonaqueous electrolyte composition; a separator; and an outer package member for housing the anode, the cathode, the nonaqueous electrolyte composition and the separator. The nonaqueous electrolyte composition includes an electrolyte salt, a nonaqueous solvent and a compound having a phosphorus-hydrogen bond or a phosphorus-carbon bond.

18 Claims, 3 Drawing Sheets

FOREIGN PATENT DOCUMENTS

| | | |
|---|---|---|
| JP | 8-321313 | 12/1996 |
| JP | 09-199168 | 7/1997 |
| JP | 10-223257 | 8/1998 |
| JP | 11-219711 | 8/1999 |
| JP | 11-283669 | 10/1999 |
| JP | 2001-126762 | 5/2001 |
| JP | 2001-202992 | 7/2001 |
| JP | 2002-198090 | 7/2002 |
| JP | 2002-082575 | 10/2002 |
| JP | 2003-142152 | 5/2003 |
| JP | 2003-229168 | 8/2003 |
| JP | 2005-149750 | 6/2005 |
| JP | 2005-340161 | 12/2005 |

* cited by examiner

NONAQUEOUS ELECTROLYTE COMPOSITION AND NONAQUEOUS ELECTROLYTE SECONDARY BATTERY

The present application claims priority to Japanese Patent Application No. 2006-167226 filed on Jun. 16, 2006 and Japanese Patent Application No. 2006-220808 filed on Aug. 14, 2006, the entire contents of which being incorporated herein by reference.

BACKGROUND

The present disclosure relates to a nonaqueous electrolyte composition and a nonaqueous electrolyte secondary battery. In particular, the present disclosure relates to a nonaqueous electrolyte composition containing a compound having a phosphorus-hydrogen bond or phosphorus-carbon bond, and a lithium ion nonaqueous electrolyte secondary battery using the nonaqueous electrolyte composition.

Various portable electronic appliances such as camera-integrated VTRs (video-tape recorders), video cameras, digital still cameras, mobile phones, portable information terminals and laptop computers have been available in the market in recent years, and lightweight of the equipment has been desired. Consequently, research and development for improving energy density of portable power sources, particularly secondary batteries, for these electronic appliances has been actively advanced.

In general, a lithium ion secondary battery uses carbon for an anode active material, a lithium-transition metal composite oxide for a cathode active material and a carbonate ester mixture for an electrolyte solution. Such a lithium ion secondary battery has been widely used for practical applications since this battery is able to obtain a larger energy density than aqueous electrolyte secondary batteries such as a lead battery and nickel-cadmium battery in the related art (see Japanese Patent Application Laid-Open (JP-A) No. 4-332479).

However, it has been a problem that the discharge capacity maintenance factor of the lithium ion secondary battery gradually decreases by repeating charge-discharge cycles.

For solving such a problem and for improving other performances, it has been proposed to add various additives to the electrolyte solution (see JP-A Nos. 7-153487, 10-223257, 11-219711, 11-283669, 2001-202992, 2002-198090, 60-23973, 8-321313 and 2005-340161, and W O02/082575).

However, it has been difficult to obtain batteries having a sufficient discharge capacity maintenance factor even in the nonaqueous secondary batteries using the electrolyte solutions described in the above-mentioned patent publications.

Therefore, it is desirable to provide a nonaqueous electrolyte composition that can improve a discharge capacity maintenance factor after repeated charge-discharge cycles, and a nonaqueous electrolyte secondary battery using the nonaqueous electrolyte composition.

SUMMARY

A nonaqueous electrolyte composition according to an embodiment contains an electrolyte salt, a nonaqueous solvent, and a compound having a phosphorus-hydrogen bond or a phosphorus-carbon bond.

Preferably, the nonaqueous electrolyte composition according to the embodiment contains an electrolyte slat, a nonaqueous solvent, and a compound having a phosphorus-hydrogen bond or a phosphorus-carbon bond as well as hydrogen capable of being dissociated as a proton.

Preferably, the nonaqueous electrolyte composition according to the embodiment contains an electrolyte salt, a nonaqueous solvent, and phosphonic acid and/or phosphinic acid.

Preferably, the nonaqueous electrolyte composition according to the embodiment contains an electrolyte salt, a nonaqueous solvent, and an organic phosphonic acid and/or organic phosphinic acid.

Further, a nonaqueous electrolyte secondary battery according to another embodiment includes a cathode containing cathode active material and an anode containing anode active material, each active material occluding and releasing lithium ions, a nonaqueous electrolyte composition, a separator, and an outer package member for housing these components, wherein the nonaqueous electrolyte composition contains an electrolyte salt, a nonaqueous solvent, and a compound having a phosphorus-hydrogen bond or a phosphorus-carbon bond.

According to the embodiment, there is provided a nonaqueous electrolyte composition that can improve a discharge capacity maintenance factor after repeating charge-discharge cycles by use of a compound having a phosphorus-hydrogen bond or a phosphorus-carbon bond, and a nonaqueous electrolyte secondary battery using the nonaqueous electrolyte composition.

These and other objects, features and advantages will become more apparent in light of the following detailed description and as illustrated in the accompanying drawings.

Additional features and advantages are described herein, and will be apparent from, the following Detailed Description and the figures.

DETAILED DESCRIPTION

Figure 1:
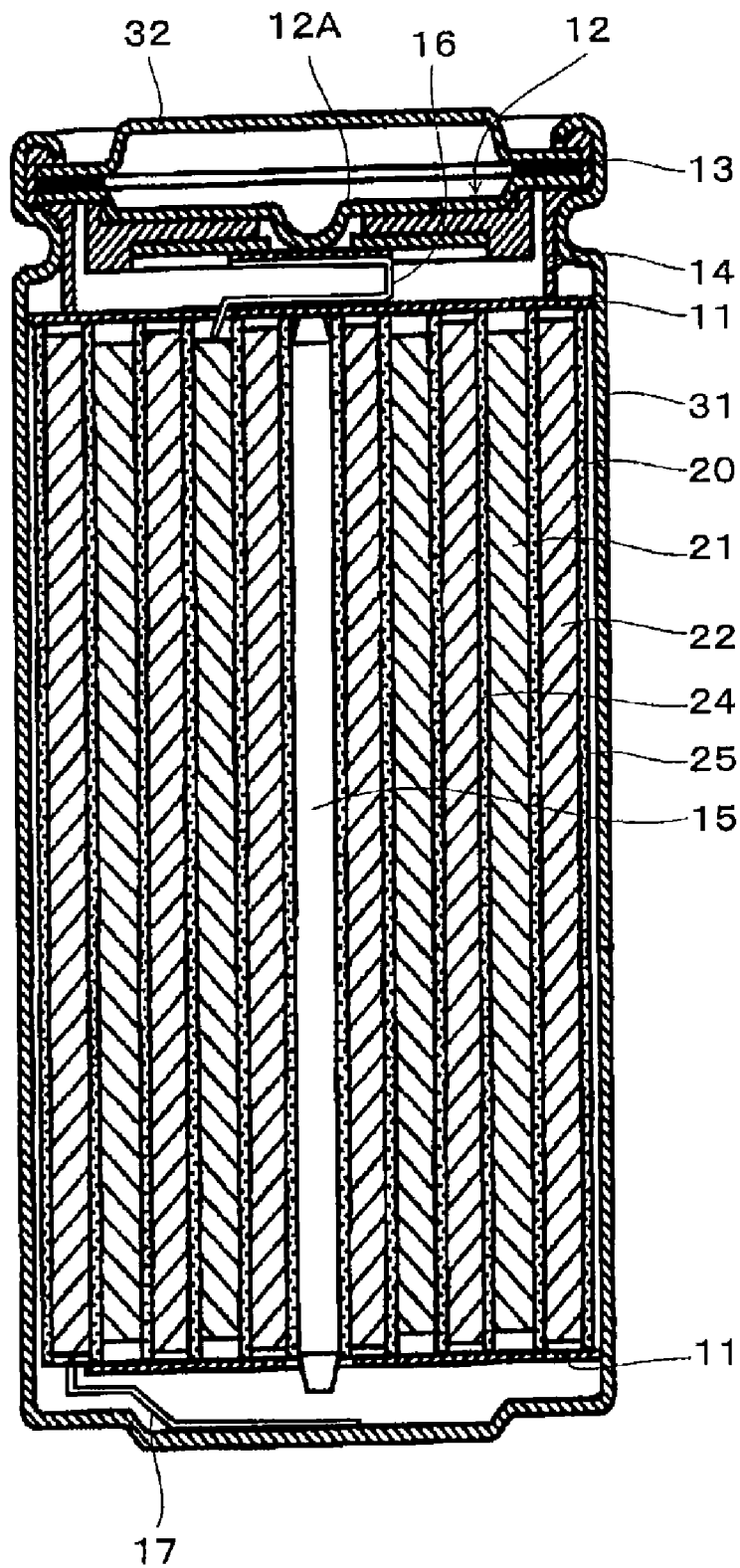
FIG. 1 shows a nonaqueous electrolyte secondary battery according to the second embodiment, and is a cross sectional view showing an example of a cylindrical battery.

A nonaqueous electrolyte composition according to the first embodiment described below. The symbol "%", used in the specification and claims of the invention, concerning the concentration and content, etc. refers to a mass percentage unless otherwise stated.

As described above, the nonaqueous electrolyte composition of the first embodiment contains an electrolyte salt, a nonaqueous solvent, and a compound having a phosphor-hydrogen (referred to "P—H" hereinafter) bond or a phosphor-carbon (referred to "P—C" hereinafter) bond, and is favorably used for a lithium ion nonaqueous electrolyte secondary battery.

The compound having the P—H or P—C bond is able to suppress a reaction between an electrode as will be described hereinafter and other components of the nonaqueous electrolyte composition that are not desirable to react with the electrode, and may improve a discharge capacity maintenance factor after repeating charge-discharge cycles.

The compound having the P—H bond or P—C bond also exhibits a secondary effect that may suppress a square or laminated lithium nonaqueous electrolyte secondary battery from being swelled under a high temperature environment.

Examples of the compound having the P—H bond or P—C bond include compounds represented by the following formula 1:

[Chemical Formula 1]

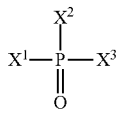

(1)

where, any one of $X^1$, $X^2$ and $X^3$ represents hydrogen H or a hydrocarbon group ($C_xH_{2x+1}$ (x represents an integer from 1 to 4), $C_yH_{2y-1}$ (y represents an integer from 2 to 4), or $C_zH_{2z-7}$ (z represents an integer from 6 to 11)); and remaining two of $X^1$, $X^2$ and $X^3$ each independently represent hydrogen H, fluorine F, chlorine Cl, bromine Br, a hydroxyl group OH or a metal salt (O-M) (M represents lithium Li, sodium Na, potassium K, rubidium Rb, cesium Cs, ammonium $NH_4$, magnesium Mg, calcium Ca, strontium Sr or barium Ba, which may form a chelate), or a hydrocarbon group ($C_xH_{2X+1}$ (x represents an integer from 1 to 4), $C_yH_{2y-1}$ (y represents an integer from 2 to 4) or $C_zH_{2z-7}$ (z represents an integer from 6 to 11)).

Examples of the compound having the P—H bond include compounds represented by the following formulae 2 to 4:

[Chemical Formula 2]

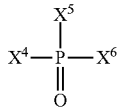

(2)

[Chemical Formula 3]

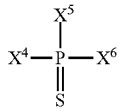

(3)

[Chemical Formula 4]

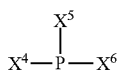

(4)

where, any one of $X^4$, $X^5$ and $X^6$ represents hydrogen H; and remaining two of $X^4$, $X^5$ and $X^6$ each independently represent hydrogen H, fluorine F, chlorine Cl, bromine Br, a hydroxyl group OH or a metal salt (O-M) (M represents lithium Li, sodium Na, potassium K, rubidium Rb, cesium Cs, ammonium $NH_4$, magnesium Mg, calcium Ca, strontium Sr or barium Ba, which may form a chelate), or a hydrocarbon group ($C_xH_{2x+1}$ (x represents an integer from 1 to 4), $C_yH_{2y-1}$ (y represents an integer from 2 to 4) or $C_zH_{2z-7}$ (z represents an integer from 6 to 11)).

Examples of the compound having the P—H bond include compounds represented by the following formulae 5 to 7:

[Chemical Formula 2]

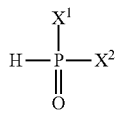

(2)

[Chemical Formula 3]

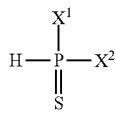

(3)

[Chemical Formula 4]

(4)

where, $X^1$ and $X^2$ each independently represent hydrogen H, fluorine F, chlorine Cl, bromine Br, a hydroxyl group OH or a metal salt (O-M) (M represents lithium Li, sodium Na, potassium K, rubidium Rb, cesium Cs, ammonium $NH_4$, magnesium Mg, calcium Ca, strontium Sr or barium Ba), which may be cross-linked.

Examples of the compound having the P—H bond and hydrogen being able to be dissociated as a proton include compounds represented by formula 8 below:

[Chemical Formula 8]

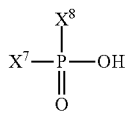

(8)

where, any one of $X^7$ and $X^8$ represents hydrogen H while the other of $X^7$ and $X^8$ represents hydrogen H, fluorine F, chlorine Cl, bromine Br, a hydroxyl group OH, a metal salt (O-M) (M represents lithium Li, sodium Na, potassium K, rubidium Rb, cesium Cs, ammonium $NH_4$, magnesium Mg, calcium Ca, strontium Sr or barium Ba, which may form a chelate) or a hydrocarbon group ($C_xH_{2x+1}$ (x represents an integer from 1 to 4), $C_yH_{2y-1}$ (y represents an integer from 2 to 4), or $C_zH_{2z-7}$ (z represents an integer from 6 to 11)).

All the compounds having the P—H bond, represented by formulae 1 to 8, may be used alone, or by mixing in an arbitrary ratio.

While phosphonic acid represented by formula 9 and phosphinic acid represented by formula 10 are preferably used as the compounds having the P—H bond and represented by formulae 1 to 8 since these compounds have hydrogen being able to be dissociated as a proton, the compound is not naturally restricted to these compounds.

[Chemical Formula 9]

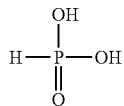

(9)

-continued

[Chemical Formula 10]

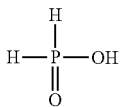
(10)

In other words, for example, a metal salt of phosphonic acid or phosphinic acid, phosphine, halogenated phosphine or thiophosphine is available so long as the compound has the structures represented by formulae 1 to 8. Among them, the compound having hydrogen being able to be dissociated as a proton is preferable.

Examples of the compound having the P—C bond include compounds represented by formula 11:

[Chemical Formula 11]

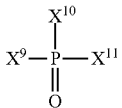
(11)

where, any one of $X^9$, $X^{10}$ and $X^{11}$ represents a hydrocarbon group ($C_xH_{2x+1}$ (x represents an integer from 1 to 4), $C_yH_{2y-1}$ (y represents an integer from 2 to 4) or $C_zH_{2z-7}$ (z represents an integer from 6 to 11)); and remaining two of $X^7$, $X^8$ and $X^9$ each independently represents hydrogen H, fluorine F, chlorine Cl, bromine Br, a hydroxyl group OH, a metal salt (O-M) (M represents lithium Li, sodium Na, potassium K, rubidium Rb, cesium Cs, ammonium $NH_4$, magnesium Mg, calcium Ca, strontium Sr or barium Ba, which may form a chelate), or a hydrocarbon group ($C_xH_{2x+1}$ (x represents an integer from 1 to 4), $C_yH_{2y-1}$ (y represents an integer form 2 to 4) or $C_zH_{2z-7}$ (z represents an integer from 6 to 11)).

Examples of the compound having the P—C bond and hydrogen being able to be dissociated as a proton include compounds (organic phosphonic acid or organic phosphinic acid, and derivatives thereof) represented by formula 12:

[Chemical Formula 12]

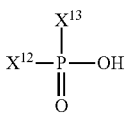
(12)

where, any one of $X^{12}$ and $X^{13}$ represents a hydrocarbon group ($C_xH_{2x+1}$ (x represents an integer from 1 to 4), $C_yH_{2y-1}$ (y represents an integer from 2 to 4), or $C_zH_{2z-7}$ (z represents an integer from 6 to 11)); and the other of $X^{12}$ and $X^{13}$ represents hydrogen H, fluorine F, chlorine Cl, bromine Br, a hydroxyl group OH, a metal salt (O-M) (M represents lithium Li, sodium Na, potassium K, rubidium Rb, cesium Cs, ammonium $NH_4$, magnesium Mg, calcium Ca, strontium or barium Ba, which may form a chelate), or a hydrocarbon group ($C_xH_{2x+1}$ (x represents an integer from 1 to 4), $C_yH_{2y-1}$ (y represents an integer from 2 to 4), or $C_zH_{2z-7}$ (z represents an integer from 6 to 11)).

Specific examples of the compound represented by formula 11 or 12 and having the P—C bond include organic phosphonic acid and organic phosphinic acid represented by formulae 13 to 16:

[Chemical Formula 13]

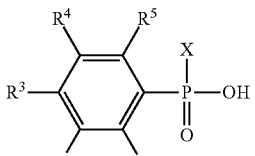
(13)

[Chemical Formula 14]

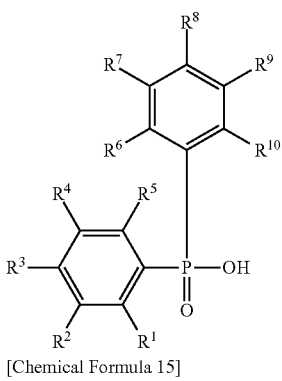
(14)

[Chemical Formula 15]

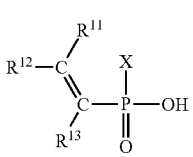
(15)

[Chemical Formula 16]

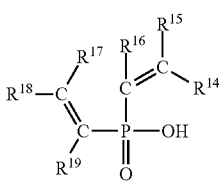
(16)

where, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$ and $R^{19}$ each independently represent $C_nH_{2n+1}$ (n represents an integer from 0 to 4); and x represents hydrogen H, a hydroxyl group OH, fluorine F, chlorine Cl or bromine Br.

Compounds having carbon-carbon multiple bonds may be favorably used among the compounds of organic phosphonic acid and organic phosphinic acid, but not restricted thereto.

While vinylphosphonic acid represented by formula 17, phenylphosphonic acid represented by formula 18, phenylphosphinic acid represented by formula 19 and diphenylphosphonic acid represented by formula 20 are preferably used as the compound having the P—C bond and represented by formulae 13 to 16 since the compound has hydrogen being able to be dissociated as a proton, the compound is naturally not restricted to these compounds.

[Chemical Formula 17]

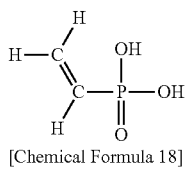
(17)

[Chemical Formula 18]

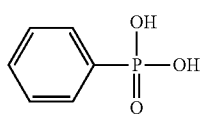
(18)

[Chemical Formula 19]

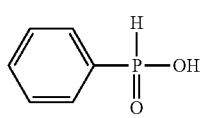
(19)

[Chemical Formula 20]

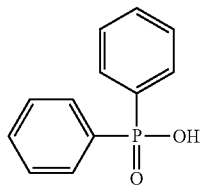
(20)

In other words, a metal salt of phosphonic acid or phosphinic acid, phosphine, halogenated phosphine or thiophosphine may be also used so long as the compound has the structures represented by formulae 11 to 17. Among them, the compound having hydrogen being able to be dissociated as a proton is preferable, organic phosphonic acid and organic phosphinic acid are more preferable, and organic phosphonic acid and organic phosphinic acid having a carbon-carbon multiple bond are further preferable. It is preferable that these compounds are not phosphate esters.

The content of the compound having the P—H bond or P—C bond in the nonaqueous electrolyte composition according to the first embodiment is preferably in the range from 0.01 to 5.0%, more preferably from 0.05 to 3.0%, and further preferably from 0.1 to 2.0%. It is difficult to obtain desired effects when the content is less than 0.01%, while the capacity may be decreased when the content exceeds 5.0%.

While the nonaqueous electrolyte composition according to the first embodiment contains the compound having the P—H bond or P—C bond as an essential component, other components may be added to the composition.

Specifically, the compound having the P—H bond or P—C bond may be combined with cyclic acid anhydride, unsaturated sulfone, cyclic phosphonate ester, cyclic carboxylate ester or cyclic phosphate ester, or a combination thereof. These components are able to suppress a reaction between an electrode to be described below and other components of the nonaqueous electrolyte composition that are not desirable to react with the electrode, so that the discharge capacity maintenance factor after repeated charge-discharge cycles may be further improved.

An effect for suppressing the square or laminated lithium nonaqueous electrolyte secondary battery from being swelled under a high temperature environment may be also obtained.

Examples of a first cyclic acid anhydride include a compound represented by formula 21:

[Chemical Formula 21]

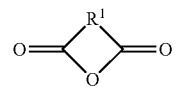
(21)

where, $R^1$ represents $C_nH_{2n}$ (n represents an integer from 2 to 5), $C_nH_{2n-2}$ (n represents an integer from 2 to 5), $C_mH_{2m-n}X_n$ (X represents fluorine F, chlorine Cl or bromine Br, m represents an integer from 2 to 4, and n satisfies $0 \leq n \leq 2m$), or $C_mH_{2m-n-2}X_n$ (x represents F, Cl or Br, m represents an integer from 2 to 4, and n satisfied $0 \leq n \leq 2m-2$).

Examples of a second cyclic acid anhydride include a compound represented by formula 22:

[Chemical Formula 22]

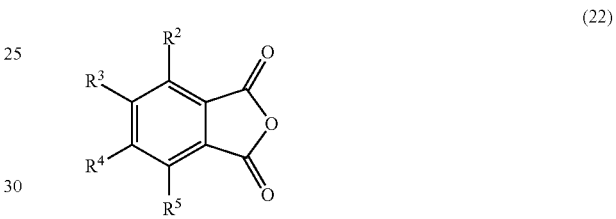
(22)

where, $R^2$, $R^3$, $R^4$ and $R^5$ each independently represent $C_{2m}H_{2m-n+1}X_n$ (X is F, Cl or Br, m represents an integer from 0 to 4, and n satisfies $0 \leq n \leq 2m+1$).

Examples of a third cyclic acid anhydride include a compound represented by formula 23:

[Chemical Formula 23]

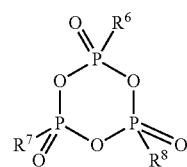
(23)

where, $R^6$, $R^7$ and $R^8$ each independently represent $C_nH_{2n-1}$ (n represents an integer from 1 to 4).

Examples of a fourth cyclic acid anhydride include a compound represented by formula 24:

[Chemical Formula 24]

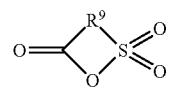
(24)

where, $R^9$ represents $C_nH_{2n}$ (n represents an integer from 2 to 5) or $C_nH_{2n-2}$ (n represents an integer from 2 to 5).

Examples of a fifth cyclic acid anhydride include a compound represented by formula 25:

[Chemical Formula 25]

(25)

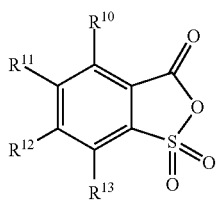

where, $R^{10}$, $R^{11}$, $R^{12}$ and $R^{13}$ each independently represent $C_mH_{2m-n+1}X_n$ (X represents fluorine F, chlorine Cl or bromine Br, m represents an integer from 1 to 4, and n satisfies $0 \leq n \leq 2m+1$).

All the cyclic acid anhydrides represented by formulae 21 to 25 may be used alone, or may be used as a mixture in an arbitrary ratio.

Succinic acid anhydride represented by formula 26, glutaric acid anhydride represented by formula 27, maleic acid anhydride represented by formula 28 and phthalic acid anhydride represented by formula 29 may be typically and preferably used as the cyclic acid anhydrides represented by formulae 21 and 22.

[Chemical Formula 26]

(26)

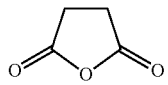

[Chemical Formula 27]

(27)

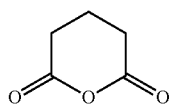

[Chemical Formula 28]

(28)

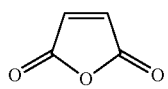

[Chemical Formula 29]

(29)

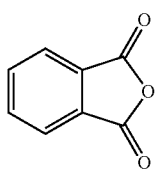

Needless to say, however, the compound is not restricted thereto. In other words, for example, citraconic acid anhydride, itaconic acid anhydride, hexafluoroglutaric acid anhydride, 3-fluorophthalic acid anhydride or 4-fluorophthalic acid anhydride may be available so long as the compound has the structures represented by formulae 21 to 25.

The content of the cyclic acid anhydride in the nonaqueous electrolyte composition according to the first embodiment of the present invention is preferably in the range from 0.01 to 5%, more preferably from 0.05 to 3%, and further preferably from 0.1 to 2%. It may be difficult to obtain desired effects when the content is less than 0.01%, while the discharge capacity may be decreased when the content exceeds 5%.

Examples of a first unsaturated sulfone include a compound represented by formula 30:

[Chemical Formula 30]

(30)

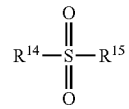

where, $R^{14}$ represents $C_nH_{2n-1}$ (n represents an integer from 1 to 4); and $R^{15}$ represents $C_nH_{2n-1}$ (n represents an integer from 1 to 4) or $C_nH_{2n+1}$ (n represents an integer from 1 to 4).

Examples of a second unsaturated sulfone include a compound represented by formula 31:

[Chemical Formula 31]

(31)

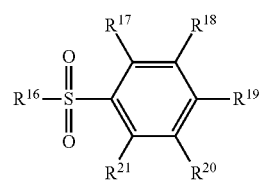

where, $R^{16}$ represents $C_nH_{2n-1}$ (n represents an integer from 1 to 4); and $R^{17}$, $R^{18}$, $R^{19}$, $R^{20}$ and $R^{21}$ each independently represent $C_mH_{2m-n+1}X_n$ (X represents fluorine F, chlorine Cl or bromine Br, m represents an integer from 1 to 4, and n satisfies $0 \leq n \leq 2m+1$).

All the unsaturated sulfones represented by formulae 30 and 31 may be used alone, or by mixing them in an arbitrary ratio.

While divinyl sulfone represented by formula 32 and methylvinyl sulfone represented by formula 33 may be typically and preferably used as the unsaturated sulfone represented by formula 30, the compound is not naturally restricted to these compounds.

[Chemical Formula 32]

(32)

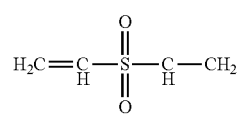

[Chemical Formula 33]

(33)

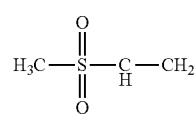

In other words, phenylvinyl sulfone may be used, for example, so long as the compound has the structures represented by formulae 30 and 31.

The content of the unsaturated sulfone in the nonaqueous electrolyte composition according to the first embodiment of the present invention is preferably in the range from 0.01 to 5%, more preferably from 0.05 to 3%, and further preferably from 0.1 to 2%. It is difficult to realize the desired effects when the content is less than 0.01%, while discharge capacity may be decreased when the content exceeds 5%.

Examples of a first cyclic phosphonate ester (typically sultone) include a compound represented by formula 34:

[Chemical Formula 34]

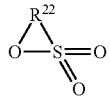
(34)

where, $R^{22}$ represents $C_nH_{2n}$ (n represents an integer from 2 to 5) or $C_nH_{2n-2}$ (n represents an integer from 2 to 5).

Examples of a second cyclic phosphonate ester include a compound represented by formula 35:

[Chemical Formula 35]

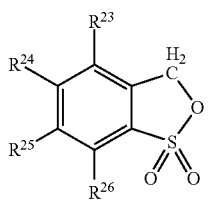
(35)

where, $R^{23}$, $R^{24}$, $R^{25}$ and $R^{26}$ each independently represent $C_nH_{2m-n+1}X_n$ (X represents fluorine F, chlorine Cl or bromine Br, m represents an integer from 1 to 4, and n satisfies $0 \leq n \leq 2n+1$).

All the cyclic phosphonate esters represented by formulae 34 and 35 may be used alone, or by mixing in an arbitrary ratio.

Typically, 3-hydroxypropane sulfonic acid γ-sultone (1,3-propane sultone) represented by formula 36 and 3-hydroxypropene sulfonic acid γ-sultone (1,3-propene sultone) represented by formula 37 may be preferably used as the cyclic phosphonate ester represented by formula 34.

[Chemical Formula 36]

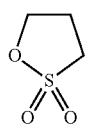
(36)

[Chemical Formula 37]

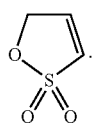
(37)

Typically, α-hydroxy-o-toluenesulfonic acid γ-sultone (toluene sultone) represented formula 38 may be preferably used as the cyclic phosphonate ester represented by formula 35.

[Chemical Formula 38]

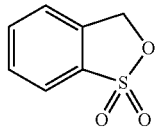
(38)

However, the compound is not naturally restricted to these compounds. In other words, for example, 3-hydroxybutane sulfonic acid γ-sultone may be used so long as the compound has the structures represented by formulas 34 and 35.

The content of the cyclic phosphonate ester in the nonaqueous electrolyte composition according to the first embodiment of the present invention is preferably in the range from 0.01 to 5%, more preferably from 0.05 to 3%, and further preferably from 0.1 to 2%. It may be difficult to obtain desired effects when the content is less than 0.01%, while the discharge capacity may be deceased when the content exceeds 5%.

Example of a first cyclic carboxylate ester include a compound represented by formula 39:

[Chemical Formula 39]

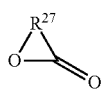
(39)

where, $R^{27}$ represents $C_nH_{2n}$ (n represents an integer form 2 to 5) or $C_nH_{2n-2}$ (n represents an integer from 2 to 5).

Examples of a second cyclic carboxylate ester include a compound represented by formula 40:

[Chemical Formula 40]

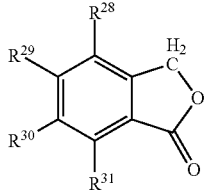
(40)

where, $R^{28}$, $R^{29}$, $R^{30}$ and $R^{31}$ each independently represents $C_mH_{2m-n+1}X_n$ (X represents fluorine F, chlorine Cl or bromine Br, m represents an integer from 1 to 4, and n satisfies $0 \leq n \leq 2m+1$).

All the cyclic carboxylate esters represented by formulae 39 and 40 may be used alone or by mixing them in an arbitrary ratio.

Typically, while γ-butyrolactone represented by formula 41 and δ-valerolactone represented by formula 42 may be preferably used as the cyclic carboxylate ester represented by formula 39 or 40, the compound is not restricted to these compounds.

[Chemical Formula 41]

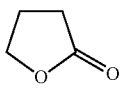
(41)

[Chemical Formula 42]

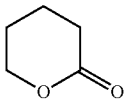
(42)

In other words, γ-crotonolactone and cumalanone may be used, for example, so long as the compound has the strictures represented by formulae 39 and 40.

The content of the cyclic carboxylate ester in the nonaqueous electrolyte composition according to the first embodiment is preferably in the range from 0.01 to 5%, more preferably from 0.05 to 3%, and further preferably from 0.1 to 2%. It may be difficult to obtain desired effects when the content is less than 0.01%, while the discharge capacity may be decreased when the content exceeds 5%.

Examples of a first cyclic phosphate ester include a compound represented by formula 43:

[Chemical Formula 43]

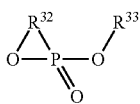
(43)

where, $R^{32}$ represents $C_nH_{2n}$ (n represents an integer from 2 to 5) or $C_nH_{2n-2}$ (n represents an integer from 2 to 5), and $R^{33}$ represents $C_nH_{2n-1}$ (n represents and integer from 1 to 4).

Examples of a second cyclic phosphate ester include a compound represented by formula 44:

[Chemical Formula 44]

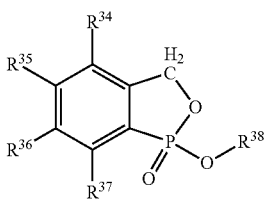
(44)

where, $R^{34}$, $R^{35}$, $R^{36}$ and $R^{37}$ each independently represent $C_mH_{2m-n+1}X_n$ (X represents fluorine F, chlorine Cl or bromine Br, m represents an integer from 1 to 4, and n satisfies $0 \leq n \leq 2m+1$); and $R^{38}$ represents $C_nH_{2n-1}$ (n represents an integer from 1 to 4).

All the cyclic phosphate esters represented by formulas 43 and 44 may be used alone or by mixing them in an arbitrary ratio.

Typically, while phosphoric acid ethylene ethyl represented by formula 45 and phosphoric acid ethylene methyl represented by formula 46 may be preferably used as the cyclic phosphate ester represented by formula 43 or 44, the compound is not naturally restricted to these compounds.

[Chemical Formula 45]

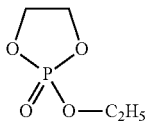
(45)

[Chemical Formula 46]

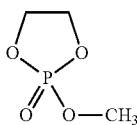
(46)

The content of the cyclic phosphate ester in the nonaqueous electrolyte composition of the first embodiment is preferably in the range from 0.01 to 5%, more preferably from 0.05 to 3%, and further preferably from 0.1 to 2%. It is difficult to realize desired effects when the content is less than 0.05%, while the discharge capacity may be decreased when the content exceeds 5%.

The nonaqueous electrolyte composition of the first embodiment of the present invention contains the compound having the P—H or P—C bond as an essential component. Further, other components may be added to the composition in addition to the cyclic acid anhydride, unsaturated sulfone, cyclic sulfonate ester, cyclic carboxylate ester and cyclic phosphate ester.

Specifically, these components may be combined with carbonate ester having a carbon-carbon multiple bond to consequently enable the discharge capacity maintenance factor after the repeated charge-discharge cycles to be improved.

Typically, an example of carboxylate ester having the carbon-carbon multiple bond includes a carbonate ester having a hydrocarbon group containing a carbon-carbon multiple bond (such as carbon-carbon double bond and triple bond), and vinylene carbonate as one of the carbonate ester may be favorably used. However, the compound is not naturally restricted to vinylene carbonate, and vinylethylene carbonate may be also used.

The content of the carbonate ester having the multiple bond in the nonaqueous electrolyte composition according to the first embodiment is preferably in the range from 0.01 to 5%, more preferably from 0.05 to 3%, and further preferably from 0.1 to 2%. It is difficult to obtain desired effects when the content is less than 0.01%, while the discharge capacity may be decreased when the content exceeds 5%.

When a given polymer compound is added, the polymer compound is swelled with the nonaqueous electrolyte composition according to the first embodiment so that the nonaqueous electrolyte composition is impregnated or retained with the polymer compound.

The nonaqueous electrolyte composition of a battery obtained may be effectively suppressed from leaking by swelling, gelling or non-fluidizing the polymer compound. A linear carbonate ester is conjectured to be excellent in impregnability into the polymer compound, although the carbonate ester is described in detail hereinafter, and is supposed to improve the discharge capacity maintenance factor after repeated charge-discharge cycles of the battery obtained.

Examples of the polymer compound include vinyl formal represented by formula 47, polyacrylate ester represented by formula 48 and polyvinylidene fluoride represented by formula 49.

[Chemical Formula 47]

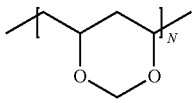

(47)

N in formula 47 denotes the degree of polymerization, and is preferably in the range from 100 to 10,000. Gelation is insufficient when N is less than 100, while the viscosity increases and the capacity largely decreases when N exceeds 10,000.

[Chemical Formula 48]

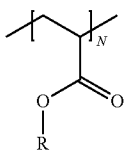

(48)

R in formula 48 denotes $C_nH_{2n-1}O_m$ (n denotes an integer from 1 to 8 and m denotes an integer from 0 to 4), and N denotes the degree of polymerization preferably in the range from 100 to 10,000. Gelation is difficult when N is less than 100, while fluidity decreases when N exceeds 10,000.

[Chemical Formula 49]

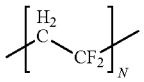

(49)

N in formula 49 denotes the degree of polymerization preferably in the range from 100 to 10,000. Gelation is difficult when N is less than 100, while the viscosity increases when N exceeds 10,000.

The content of the polymer compound is preferably in the range from 0.1 to 5%. Gelation is difficult when the content is less than 0.1%, while fluidity may be decreased when the content exceeds 5%.

On the other hand, examples of the nonaqueous solvent used for the nonaqueous electrolyte composition according to the first embodiment include various solvents having a high dielectric constant and low viscosity. While examples of the favorably used solvent having a high dielectric constant include ethylene carbonate and propylene carbonate, it should be appreciated that the solvent is not restricted thereto. Examples of the solvent available include cyclic carbonate esters such as butylene carbonate, vinylene carbonate, 4-fluoro-1,3-dioxolan-2-on (fluoroethylene carbonate), 4-chloro-1,3-dioxolan-2-on (chloroethylene carbonate) and trifluoromethyl ethylene carbonate.

Lactones such as γ-butyrolactone and γ-valerolactone, lactams such as N-methylpyrrolidone, cyclic carbamic acid esters such as N-methyl oxazolidinone and sulfone compounds such as tetramethyl sulfone may be used as the solvent having a high dielectric constant in place of or in combination with the cyclic carbonate esters.

While dimethyl carbonate, ethylmethyl carbonate and diethyl carbonate may be favorably used as the solvent having a low viscosity, it should be appreciated that other solvents available include linear carbonate esters such as methylpropyl carbonate; linear carboxylate esters such as methyl acetate, ethyl acetate, methyl propionate, ethyl propionate, methyl butyrate, methyl isobutyrate, methyl trimethylacetate and ethyl trimethylacetate; linear amides such as N,N-dimethyl acetamide; linear carbamate esters such as methyl N,N-diethylcarbamate and ethyl N,N-diethylcarbamate; and ethers such as 1,2-dimethoxyethane, tetrahydrofuran, tetrahydropyran and 1,3-dioxolane.

One of the solvents having a high dielectric constant and the solvents having a low viscosity may be used alone, or may be used by mixing a plurality of them in an arbitrary ratio in the nonaqueous electrolyte composition according to the first embodiment of the present invention.

The content of the nonaqueous solvent is preferably in the range from 70 to 90%. The viscosity may be too high when the content is less than 70%, while it is difficult to obtain sufficient conductivity when the content exceeds 90%.

Any electrolyte salt that evolves ions by being dissolved or dispersed in the nonaqueous solvent may be used for the nonaqueous electrolyte composition according to the first embodiment, and lithium hexafluorophosphate $LiPF_6$ is favorably used. However, it should be appreciated that the electrolyte salt is not restricted thereto.

Examples of the electrolyte salt include inorganic lithium salts such as lithium tetrefluoroborate $LiBF_4$, lithium hexafluoroarsenate $LiAsF_6$, lithium hexafluoroantimonate $LiSbF_6$, lithium perchlorate $LiClO_4$, and lithium tetrachloroaluminate $LiAlCl_4$; and lithium salts of perfluoroalkane phosphinic acid derivatives such as lithium trifluoromethane sulfonate $LiCF_3SO_3$, lithium bis(trifluoromethanesulfone)imide $LiN(CF_3SO_2)_2$, lithium bis(pentafluorosulfone)methide $LiC(C_2F_5SO_2)_2$, and lithium tris(trifluoromethanesulfone)methide $LiC(CF_3SO_2)_3$. These salts may be used alone, or in combination.

The content of the electrolyte salt is preferably in the range from 10 to 30%. It is difficult to obtain sufficient conductivity when the content is less than 10%, while the viscosity becomes too high when the content exceeds 30%.

A nonaqueous electrolyte secondary battery according to the second embodiment is described below.

FIG. 1 shows the nonaqueous electrolyte secondary battery according to the second embodiment, and is a cross sectional view showing an example of a cylindrical battery.

As shown in FIG. 1, the secondary battery has a battery element 20 within an approximately hollow cylindrical battery can 31 as a part of an outer package member. The battery element 20 is coiled with a cathode 21 and an anode 22 arranged so that both electrodes are opposed with interposition of a separator 24 and a nonaqueous electrolyte composition layer (not shown) containing the nonaqueous electrolyte composition. The rest of the battery element 20 from which the nonaqueous electrolyte composition layer has been removed is referred to a coiled electrode 25.

The battery can 31 is made of a steel sheet on which, for example, nickel plating is applied, and one end of the can is closed while the other end thereof is open. Insulating plates 11 are arranged within the battery can 31 so as to sandwich the battery element 20 from the top and bottom of the battery can.

A battery cap 32 constituting a part of the outer package member, and a safety valve mechanism 12 and a positive temperature coefficient (PTC) element 13 are crimped at the open end of the battery can 31 with interposition of a gasket 14 in order to hermetically seal the inside of the battery can 31. The safety valve mechanism 12 and PTC element 13 are provided at the inner side of the battery cap 32.

The battery cap 32 is made of, for example, the same material as the battery can 31. The safety valve mechanism 12 is electrically connected to the battery cap 32 with interposition of the PTC element 13. The safety valve mechanism 12 serves for breaking the electrical connection between the battery cap 32 and the battery element 20 by inverting a disk plate 12A when an inner pressure of the battery is increased a predetermined pressure or more due to internal short-circuit or external heat. The PTC element 13 limits a current by the increase in resistance value when the temperature is increased, and prevents abnormal heating caused by a large electric current. The PTC element 13 is made of, for example, a barium titanate-base semiconductor ceramic. The gasket 14 is made of, for example, an insulating material, and asphalt is coated on the surface of the gasket.

The battery element 20 is coiled, for example, around a center pin 15 as a center. A cathode lead 16 made of aluminum or the like is connected to the cathode 21 of the battery element 20, while an anode lead 17 made of nickel or the like is connected to the anode 22 of the battery element 20. The cathode lead 16 is electrically connected to the battery cap 32 by being welded to the safety valve mechanism 12, and the anode lead 17 is welded and electrically connected to the battery can 31.

Details of the cathode 21 and anode 22 are described in the description of the following third embodiment.

Figure 2:
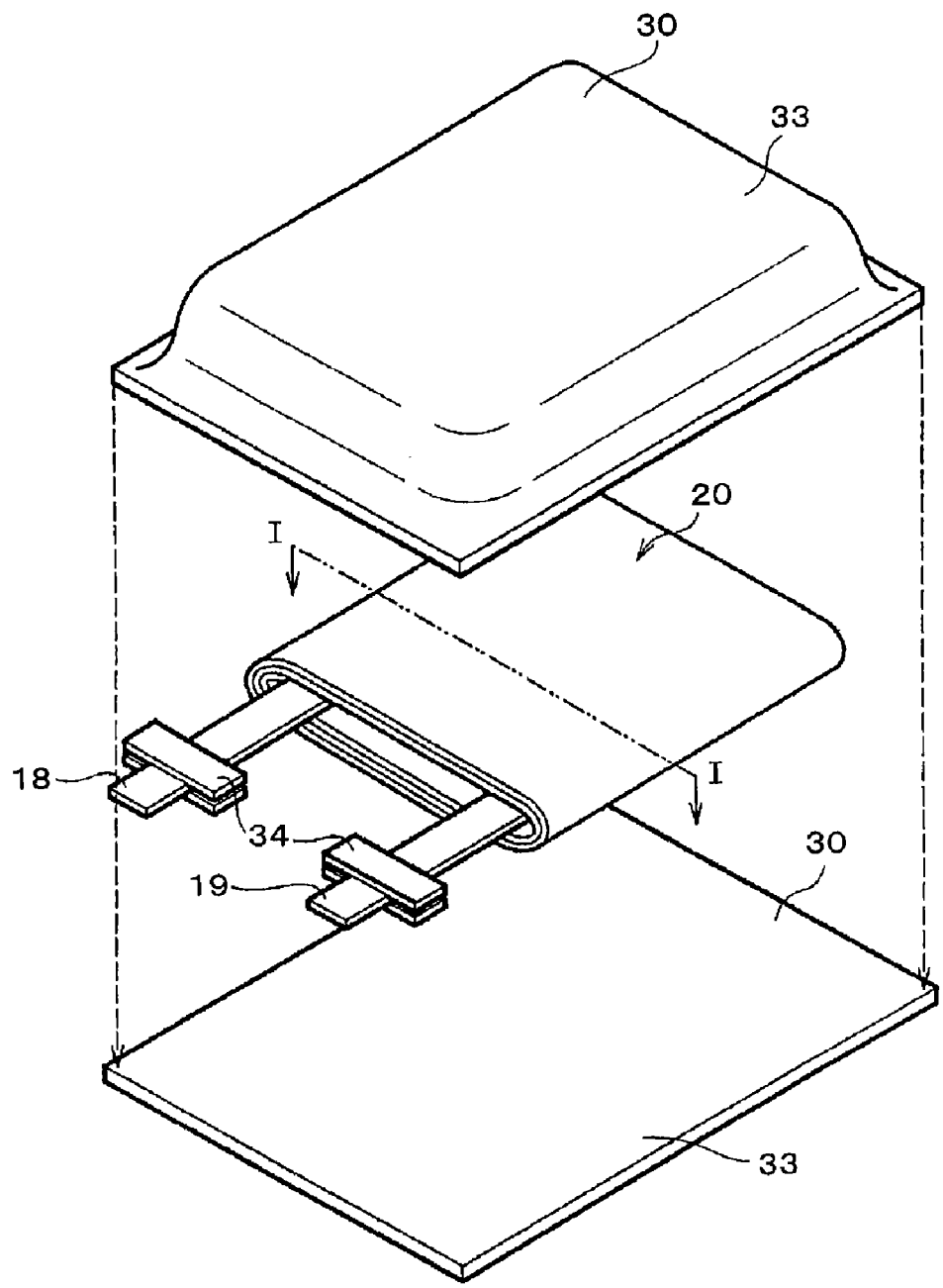
FIG. 2 shows a nonaqueous electrolyte secondary battery according to the third embodiment, and is a disassembled perspective view showing an example of a laminated battery.

FIG. 2 shows the nonaqueous electrolyte secondary battery according to the third embodiment, and is a disassembled perspective view showing an example of a laminated battery.

As shown in FIG. 2, the secondary battery is assembled by sealing a battery element 20 to which a cathode terminal 18 and anode terminal 19 are attached between films of an outer package member 30. The cathode terminal 18 and anode terminal 19 are pulled out from the inside to the outside of the outer package member 30, for example, in the same direction. The cathode terminal 18 and anode terminal 19 are made of a metal material such as, for example, aluminum Al, copper Cu, nickel Ni or stainless steel.

The outer package member 30 is made of a rectangular laminate film 33 formed by laminating, for example, a nylon film, an aluminum foil and a polyethylene film in this order. The outer package member 30 is arranged, for example, so that the polyethylene film side is opposed to the battery element 20, and edges of the film are fused or bonded with an adhesive to one another.

Adhesive films 34 are inserted between the outer package member 30 and the cathode terminal 18 and between the outer package member 30 and the anode terminal 19, respectively, for preventing external air from invading. The adhesive film 34 is made of a material adhesive to the cathode terminal 18 and anode terminal 19. For example, a polyolefin resin such as polyethylene, polypropylene, modified polyethylene or modified polypropylene is preferably selected for the adhesive film when the cathode terminal 18 and anode terminal 19 are made of the metal material as described above.

Other structure members, for example a laminate film containing no metal material, a polymer film such as polypropylene or a metal film may be used for the outer package member 30 in place of the laminate film.

The laminate film generally has a laminated structure of an outer package layer/metal foil/sealant layer (the outer package layer and sealant layer may have plural layers). The nylon film corresponds to the outer package layer, the aluminum foil corresponds to the metal foil and the polyethylene film corresponds to the sealant layer in the above-mentioned example.

The metal foil is only expected to function as a moisture-preventive barrier film, and a stainless steel foil, a nickel foil and a plated iron foil as well as the aluminum foil may be used. However, the aluminum foil is favorably used since it is lightweight and excellent in processability.

Examples of the structure of the outer package member available in the form of (outer package layer/metal foil/sealant layer) include Ny nylon/Al aluminum/CPP casted polypropylene, PET polyethylene terephthalate/Al/CPP, PET/Al/PET/CPP, PET/Ny/Al/CPP, PET/Ny/Al/Ny/CPP, PET/Ny/Al/Ny/PE polyethylene, Ny/PE/Al/LLDPE linear low density polyethylene, PET/PE/Al/PET/LDPE low density polyethylene and PET/Ny/Al/LDPE/CPP.

Figure 3:
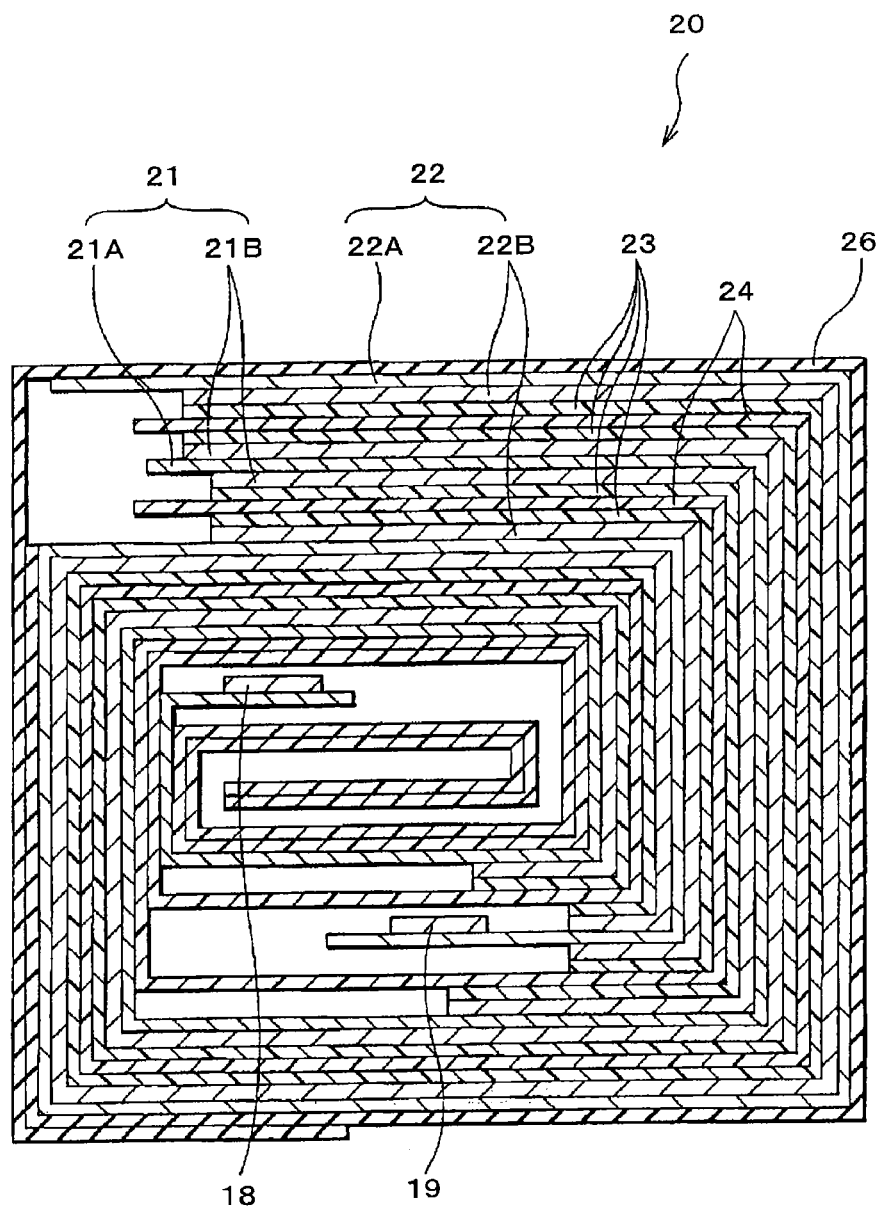
FIG. 3 is a cross sectional view of a battery element shown in FIG. 2 taken along the line I-I.

FIG. 3 shows a cross sectional view of the battery element 20 shown in FIG. 2 taken along the line I-I. In FIG. 3, a cathode 21 and an anode 22 are coiled by being faced to each other with interposition of a nonaqueous electrolyte composition layer 23 containing the nonaqueous electrolyte composition of the first embodiment and a separator 24 in the battery element 20, and the outermost circumference of the battery element is protected with a protective tape 26.

The cathode 21 has a structure in which, for example, both surfaces or one surface of a cathode current collector 21A having a pair of opposed surfaces is coated with a cathode active material layer 21B. The cathode current collector 21A has a portion where the cathode active material layer 21B is exposed without being covered at one end in the longitudinal direction thereof, and the cathode terminal 18 is attached to this exposed portion.

The cathode current collector 21A is made of, for example, a metal foil such as an aluminum foil, a nickel foil or a stainless steel foil.

The cathode active material layer 21B contains, as the cathode active material, one or plural cathode materials capable of occluding and releasing lithium ions, and may optionally contain a conductive agent and binder.

Examples of the cathode materials capable of occluding and releasing lithium ions include sulfur S; disulfides such as iron disulfide $FeS_2$, titanium disulfide $TiS_2$, and molybdenum disulfide $MoS_2$; chalcogen compounds containing no lithium (particularly, layered compounds and spinel compounds) such as niobium selenide $NbSe_2$, vanadium oxide $V_2O_5$, titanium dioxide $TiO_2$ and manganese dioxide $MnO_2$; lithium-containing compounds; and conductive polymer compounds such as polyaniline, polythiophene, polyacetylene and polypyrrole.

The lithium-containing compound is preferable among them since high voltage and high energy density may be obtained. While examples of the lithium-containing compound include composite oxides containing lithium and transition metal elements and phosphate compounds containing lithium and transition metal elements, the compound containing cobalt Co, nickel Ni, manganese Mn, iron Fe, copper Cu, zinc Zn, chromium Cr, vanadium V, titanium Ti or an arbitrary mixture thereof is particularly preferable in terms of obtaining higher voltage.

Representative examples of the lithium-containing compounds are represented by the following formulae 50 and 51:

$$Li_xMIO_2 \qquad (50)$$

$$Li_yMIIPO_4 \qquad (51)$$

where, MI and MII each denote one or a plurality of transition metal elements; and x and y usually satisfy the relations of $0.05 \leq x \leq 1.10$ and $0.05 \leq y \leq 1.10$, respectively, although x and y differ depending on the charge-discharge conditions of the battery. The compound represented by formula 50 usually has a layered structure, and the compound represented by formula 51 usually has an olivine structure.

Specific examples of the composite oxide containing lithium and the transition metal element include a lithium-cobalt composite oxide ($Li_xCoO_2$), a lithium-nickel composite oxide $LiNiO_2$, solid solutions of these composite oxides ($Li(Ni_xCo_yMn_z)O_2$); a lithium-nickel-cobalt composite oxide ($LiNi_{1-z}Co_zO_2$ (z<1)), a lithium-manganese composite oxide having a spinel structure $LiMn_2O_4$ and solid solutions of these composite oxides ($Li(Mn_{2-x}Ni_y)O_4$).

Specific examples of the phosphate compound containing lithium and the transition metal element include a lithium-iron-phosphoric acid compound having an olivine structure $LiFePO_4$ or a lithium-iron-manganese-phosphoric acid compound ($LiFe_{1-v}Mn_bPO_4$ (v<1)).

The anode 22 has a structure in which an anode active material layer 22B is provided, for example, on both surfaces or one surface of an anode current collector 22A having a pair of opposed surfaces as the cathode 21 does. The anode current collector 22A has a potion exposed without being provided with the anode active material layer 22B at one end in the longitudinal direction thereof, and the anode terminal 19 is attached to the exposed portion.

The anode current collector 22A is made of, for example, a metal foil such as a copper foil, a nickel foil or a stainless steel foil.

The anode material layer 22B contains, as the anode active material, one or a plurality of anode materials capable of occluding and releasing lithium ions and metallic lithium, and may optionally contain a conductive agent and binder.

Examples of the anode material capable of occluding and releasing lithium ions include carbon materials, metal oxides and polymer compounds. Examples of the carbon material include hardly graphitizable carbon materials, synthetic graphite materials and graphite-base materials, more specifically, heat-decomposed carbon materials, cokes, graphite materials, amorphous carbon materials, sintered materials of organic polymers, carbon fibers, activated carbon and carbon black.

Cokes include pitch coke, needle coke and petroleum coke, and the sintered materials of the organic polymer compound refer to carbonized materials obtained by sintering polymer materials such as phenol resin and furan resin at an arbitrary temperature. Examples of the metal oxide include iron oxide, ruthenium oxide and molybdenum oxide, while examples of the polymer compound include polyacetylene and polypyrrole.

The anode material capable of occluding and releasing lithium contains at least one of metal elements capable of forming an alloy with lithium and a semi-metal element as constituting elements. The anode material may be either a pure element or an alloy of the metal element and semi-metal element, and may contain at least one or a plurality of phases at least as a part of the material.

Examples of the alloy include alloys containing at least one metal element and at least one semi-metal element as well as alloys containing a plurality of metal elements, as described in the first embodiment. The alloy may contain non-metal elements. The texture of the alloy contains a solid solution, a eutectic crystal (eutectic mixture) or an intermetallic compound, or contains a plurality of them together.

Examples of the metal element or semi-metal element include tin Sn, lead Pb, magnesium Mg, aluminum Al, indium In, silicon Si, zinc Zn, antimony Sb, bismuth Bi, gallium Ga, germanium Ge, arsenic As, silver Ag, hafnium Hf, zirconium Zr and yttrium Y.

The element is preferably a group 14 metal element or semi-metal element in the long periodic table, and silicon or tin is particularly preferable. Silicon and tin have high ability for occluding and releasing lithium, and is able to obtain high energy density.

The tin alloy contains, for example, at least one element selected from the group consisting of silicon Si, magnesium Mg, nickel, copper, iron, cobalt, manganese, zinc, indium, silver, titanium Ti, germanium, bismuth, antimony and chromium Cr as a second constituting element other than tin.

The silicon alloy contains, for example, at least one element selected from the group consisting of tin, magnesium, nickel, copper, iron, cobalt, manganese, zinc, indium, silver, titanium, germanium, bismuth, antimony and chromium as a second constituting element other than silicon.

The tin compound or silicon compound may contain, for example, oxygen or carbon C, and may contain the above-mentioned second element in addition to tin or silicon.

The anode material may be an element that forms a composite oxide with lithium such as titanium. Metallic lithium may be precipitated after dissolution, and magnesium and aluminum other than lithium may be precipitated after dissolution.

The separator 24 is made of an insulating thin film having high ion permeation rate and desired mechanical strength such as a porous membrane made of a polyolefin synthetic resin such as polypropylene or polyethylene, or a porous membrane of an inorganic material such as a non-woven fabric made of ceramics. The separator may be formed by laminating a plurality of porous membranes. The separator having the polyolefin porous membrane is favorable since the membrane is excellent in separating ability between the cathode 21 and the anode 22 so that internal short-circuit is prevented from being formed and open circuit voltage is protected from being further decreased.

An exemplary method for manufacturing the secondary battery is described below.

The cylindrical secondary battery is manufactured as follows.

The cathode 21 is manufactured first. When a granular cathode active material is used, for example, a cathode composite agent is prepared by mixing a cathode active material and optionally a conductive agent and binder, and a slurry of the cathode composite material is prepared by dispersing the cathode composite agent in a dispersion medium such as N-methyl-2-pyrrolidone.

The slurry of the cathode composite agent is applied on the cathode current corrector 21A followed by drying and compression molding to form the cathode active material layer 21B.

Subsequently, the anode 22 is manufactured. When a granular anode active material is used, for example, an anode composite agent is prepared by mixing an anode active material and optionally a conductive agent and binder, and a slurry of the anode composite agent is prepared by dispersing the slurry in a dispersion medium such as N-methyl-2-pyrrolidone. The slurry of the anode composite agent is applied on the anode current collector 22A followed by drying, and the anode active material layer 22B is formed by compression molding.

Then, the cathode lead 16 is pulled out of the cathode current collector 21A, and the anode lead 17 is pulled out of the anode current collector 22A. Thereafter, the coiled electrode 25 is formed, for example, by coiling the cathode 21 and anode 22 with interposition of the separator 24. The coiled cathode 21 and anode 22 are inserted into a pair of insulation plates 11 and housed in the battery can 31 by welding the tip of the cathode lead 16 to the safety valve mechanism 12 and the tip of the anode lead 17 to the battery can 31. After housing the cathode 21 and anode 22 into the battery can 31, the nonaqueous electrolyte composition of the first invention (not shown) is injected into the battery can 31, and the separator 24 is impregnated with the electrolyte composition. Then, the battery cap 32, the safety valve mechanism 12 and the PTC element 13 are fixed to the edge of the opening of the battery can 31 by crimping with interposition of the gasket 14 in order to complete the secondary battery shown in FIG. 1.

The secondary battery may be also manufactured as follows.

For example, the cathode 21 and anode 22 are coiled after applying the nonaqueous electrolyte composition layer on the electrode, or on the separator 24, and the coiled electrode is sealed in the battery can 31, instead of injecting the nonaqueous electrolyte composition after manufacturing the coiled electrode 25.

This manufacturing method permits the nonaqueous electrolyte composition layer 23 to contain different components at different positions, or a concentration gradient may be appropriately provided.

The nonaqueous electrolyte composition according to the first embodiment is desirably applied on the cathode 21 or on the side face of the separator 24 opposed to the cathode in this case. Since the nonaqueous electrolyte composition according to the first embodiment contains a compound having the P—H bond or P—C bond capable of suppressing reactivity with the cathode active material layer 21B, expression of the effect is facilitated by applying the composition on the cathode 21 and on the side face of the separator 24 opposed to the cathode.

In a favorable combination between the nonaqueous electrolyte composition applied on the cathode and on the side face of the separator opposed to the cathode and the nonaqueous electrolyte composition applied on the anode and on the side face of the separator opposed to the anode, the content of propylene carbonate is increased at the cathode side while the content of ethylene carbonate is increased at the anode side. However, the composition is naturally not restricted thereto. Alternately, lactones such as γ-butyrolactone may be added at the cathode side.

A gelatinous nonaqueous electrolyte secondary battery containing nonaqueous electrolyte composition may be manufactured as follows. The coiled electrode 25 is manufactured by applying a monomer of a polymer compound such as polyvinyl fluoride on the cathode 21 and anode 22, or on the separator 24, the coiled electrode is housed in the battery cam 31, and the gelatinous nonaqueous electrolyte composition is formed by injecting the nonaqueous electrolyte composition. However, the monomer is preferably allowed to polymerize in the battery can 31 since adhesiveness between the nonaqueous electrolyte composition and the separator 24 is improved and internal resistance is lowered. It is also preferable to form the gelatinous nonaqueous electrolyte composition by injecting the nonaqueous electrolyte composition into the battery can 31 since manufacture of the battery is simplified with a smaller number of steps.

The laminated secondary battery may be manufactured as follows.

The cathode 21 is manufactured first. When a granular cathode active material is used, for example, a cathode composite agent is prepared by mixing the cathode active material and optionally a conductive agent and binder, and a slurry of the cathode composite agent is manufactured by dispersing the mixture in a dispersion medium such as N-vinyl-2-pyrrolidone.

The cathode composite agent is then applied on the cathode current collector 21A followed by drying and compression molding to form the cathode active material layer 21B.

The anode 22 is also manufactured. When a granular anode active material is used, for example, an anode composite agent is prepared by mixing the anode active material and optionally a conductive agent and binder, and a slurry of the anode composite agent is manufactured by dispersing the mixture in a dispersion medium such as N-methyl-2-pyrrolidone. Thereafter, the anode composite material is applied on the anode current collector 22A followed by drying and compression molding to form the anode active material layer 22B.

Subsequently, the cathode terminal 18 is attached to the cathode 21 while the anode terminal 19 is attached to the anode 22. Then, the separator 24, cathode 21, separator 24 and anode 22 are sequentially laminated and coiled, and a coiled electrode is formed by bonding the protective tape 26 to the outermost circumference of the coiled electrode. The coiled electrode is inserted between the laminate films 33, and is formed into a bag by fusing the outer edges except one edge.

A nonaqueous electrolyte composition containing the above-mentioned compound having the P—H bond, an electrolyte salt such as lithium hexafluorophosphate and a nonaqueous solvent such as ethylene carbonate is prepared thereafter. The composition is injected into the coiled electrode from the opening of the laminate film 33, and is sealed by heat-fusing the opening of the laminate film 33. The nonaqueous electrolyte composition layer 23 is thus formed, so that the secondary battery as shown in FIGS. 2 and 3 is completed.

The secondary battery may be also manufactured as follows. For example, the nonaqueous electrolyte composition is applied on the cathode 21 and anode 22, or on the separator 24 followed by coiling them, and the coiled electrode is sealed between the laminate films 33, instead of injecting the nonaqueous electrolyte composition according to the firth embodiment after manufacturing the coiled electrode. This manufacturing method permits the nonaqueous electrolyte composition layer 23 to contain different components at different positions, or an appropriate concentration gradient may be provided in the composition layer.

The nonaqueous electrolyte composition is desirably applied on the cathode 21 or on the side face of the separator opposed to the cathode in this case. Since the non-electrolyte composition contains the compound having the P—H bond or P—C bond capable of suppressing reactivity with the cathode active material layer 21B, the effect of the composition is enhanced by applying it on the cathode 21 or on the side face of the separator 24 opposed to the cathode.

While it is desirable that the laminated second battery is also independently coated as in the cylindrical secondary battery, the manufacturing method is naturally restricted to this method.

The gelatinous nonaqueous electrolyte secondary battery having the gelatinous nonaqueous electrolyte composition may be manufactured as follows. The monomer of the polymer compound such as polyvinylidene fluoride is applied on the cathode 21 and anode 22, or on the separator 24, followed by coiling the electrodes and separator, and the gelatinous nonaqueous electrolyte composition layer may be formed by injecting the nonaqueous electrolyte composition after housing the electrodes within the outer package member 30 made of a laminate film. However, it is preferable to permit the monomer to polymerize within the outer package member 30, since adhesiveness between the nonaqueous electrolyte composition and the separator 24 is improved and internal resistance is lowered. It is also preferable to form the gelatinous nonaqueous electrolyte composition layer by injecting the nonaqueous electrolyte composition into the outer package member 30 since the battery may be simply manufactured with a smaller number of manufacturing steps.

Upon charging of the above-described secondary battery, lithium ions are released from the cathode active material layer 21B, and are occluded in the anode active material layer 22B through the nonaqueous electrolyte composition layer 23. Upon discharge of the battery, lithium ions are released from the anode active material layer 22B, and are occluded in the cathode active material layer 21B through the nonaqueous electrolyte composition layer 23.

The nonaqueous electrolyte composition contained in the nonaqueous electrolyte composition layer 23 contains a compound having a phosphorus-hydrogen bond or phosphorus-carbon bond. The compound may suppress the nonaqueous active material layer 21B from reacting with other components of the nonaqueous electrolyte composition that is not desirable to react. Consequently, the battery performance of the secondary battery is not largely deteriorated by charge-discharge cycles, and the discharge capacity maintenance factor after the charge-discharge cycles is improved. The compound having the phosphorus-hydrogen bond or phosphorus-carbon bond is able to suppress the square or laminated lithium ion nonaqueous electrolyte secondary battery from being swelled under a high temperature environment.

EXAMPLES

While the embodiment are described in detail with reference to examples and comparative examples, they are restricted to these examples.

Specifically, the cylindrical battery as shown in FIG. 1 was manufactured by the procedures shown in the examples below, and the performance of the battery was evaluated.

Example 1

Homogeneously mixed were 94 parts by weight of a lithium-cobalt composite oxide $LiCoO_2$ as a cathode active material, 3 parts by weight of graphite as a conductive agent and 3 parts by weight of polyvinylidene fluoride PVdF as a binder, and N-methyl-2-pyrrolidone was added to the mixture to obtain a coating liquid of a cathode composite agent.

Then, the coating liquid of the cathode composite agent obtained was applied on both surfaces of an aluminum foil with a thickness of 20 μm, and was dried to form a cathode composite agent layer having 50 mg/cm$^2$ of the agent per one surface. The cathode was manufactured by cutting the coated aluminum foil into a size with a width of 50 mm and a length of 600 mm, and a cathode lead was attached to the cathode.

Subsequently, 97 parts by weight of graphite as an anode active material and 3 parts by weight of PVdF as a binder were homogeneously mixed, and N-methyl-2-pyrrolidone was added to the mixture to obtain a coating liquid of an anode composite agent. Then, the coating liquid of the anode composite agent obtained was homogeneously applied on both surfaces of a copper foil with a thickness of 15 μm that serves as an anode current collector, and was dried to form a layer of the anode composite agent having 20 mg/cm$^2$ of the agent per one surface. An anode was manufactured by cutting the copper foil into a size with a width of 50 mm and a length of 600 mm, and an anode lead was attached to the anode.

A mixture of ethylene carbonate, propylene carbonate, dimethyl carbonate, ethylmethyl carbonate, vinylene carbonate, lithium hexafluorophosphate and phosphonic acid in a proportion of 12:10:54.8:5:1:17:0.2 (weight ratio) was used as the nonaqueous electrolyte composition. The concentration of phosphonic acid was 0.2%.

The cathode and anode were laminated with interposition of a separator made of a micro-porous polyethylene film with a thickness of 25 μm, and the laminate was coiled to manufacture a coiled electrode. The coiled electrode was inserted between a pair of insulation plates, the anode lead was welded to the bottom of a steel battery can with a diameter of 18 mm while the cathode lead was welded to a projection of a safety valve mechanism, and the coiled electrode was housed in the battery can. After injecting 3.8 g of the nonaqueous electrolyte composition into the battery can, a battery cap was crimped to the steel battery can with interposition of an insulation gasket for sealing the battery can. Thereby, the safety valve mechanism, PTC element and battery cap were fixed to obtain the cylindrical secondary battery of this example. The capacity of the battery was 2,200 mAh.

The battery was charged for 3 hours at 23° C. with a current of 2,200 mA at a voltage of 4.2 V as an upper limit, and then discharged at 23° C. until the voltage reaches 3.2 V with a current of 2,200 mA. The discharge capacity was measured after repeating this charge-discharge cycle 300 times to calculate the discharge capacity maintenance factor. The results obtained are shown in Table 1.

Table 1 shows that the discharge capacity maintenance factor after repeating the charge-discharge cycles at 23° C. was improved as compared with the battery in Comparative Example 1 when the compound having the P—H bond was used.

Example 2

A cylindrical secondary battery of this example was obtained by repeating the procedure as in Example 1, except that a mixture containing ethylene carbonate, propylene carbonate, dimethyl carbonate, ethylmethyl carbonate, vinylene carbonate, lithium hexafluorophosphate and phosphonic acid was used in a proportion of 12:10:54:5:1:17:1 (weight ratio) as the nonaqueous electrolyte composition (the concentration of phosphonic acid was 1%). The discharge capacity maintenance factor was calculated as described above. The results obtained are shown in Table 1.

Table 1 shows that the charge capacity maintenance factor after repeating charge-discharge cycles at 23° C. is improved by using the compound having the P—H bond as compared with that in Comparative Example 1.

Example 3

A cylindrical secondary battery of this example was obtained by repeating the same procedure as in Example 1, except that a mixture of ethylene carbonate, propylene carbonate, dimethyl carbonate, ethylmethyl carbonate, vinylene carbonate, lithium hexafluorophosphate and phosphinic acid in a proportion of 12:10:54.95:5:1:17:0.05 (weight ratio) was used as the nonaqueous electrolyte composition (the concentration of phosphinic acid was 0.05%). The discharge capacity maintenance factor was calculated as described above. The results obtained are shown in Table 1.

Table 1 shows that the discharge capacity maintenance factor after repeating the charge-discharge cycles at 23° C. was improved by using the compound having the P—H bond as compared with the result in Comparative Example 1.

Example 4

A cylindrical secondary battery of this example was obtained by repeating the same procedure as in Example 1, except that a mixture of ethylene carbonate, propylene carbonate, dimethyl carbonate, ethylmethyl carbonate, vinylene carbonate, lithium hexafluorophosphate and phosphinic acid mixed in a proportion of 12:10:54.8:5:1:17:0.2 (weight ratio) was used as the nonaqueous electrolyte composition (the concentration of phosphinic acid was 0.2%). The discharge capacity maintenance factor was calculated as described above. The results obtained are shown in Table 1.

Table 1 shows that the discharge capacity maintenance factor after repeating the charge-discharge cycles at 23° C. was improved by using the compound having the P—H bond as compared with the result in Comparative Example 1.

Comparative Example 1

A cylindrical secondary battery of this example was obtained by repeating the same procedure as in Example 1, except that a mixture of ethylene carbonate, propylene carbonate, dimethyl carbonate, ethylmethyl carbonate, vinylene carbonate and lithium hexafluorophosphate acid in a proportion of 12:10:55:5:1:17 (weight ratio) was used as the non-aqueous electrolyte composition (without adding the compound having the P—H bond). The discharge capacity maintenance factor was calculated as described above. The results obtained are shown in Table 1.

Table 1 shows that the discharge capacity maintenance factor after repeating the charge-discharge cycles at 23° C. was inferior to the results in Examples 1 to 4 when the compound having the P—H bond was not used.

TABLE 1

| | COMPOUND HAVING P—H BOND | | DISCHARGE CAPACITY MAINTENANCE FACTOR AFTER 300 CYCLES(%) |
|---|---|---|---|
| | TYPE | CONCENTRATION(%) | |
| EXAMPLE 1 | PHOSPHONIC ACID | 0.2 | 87.7 |
| EXAMPLE 2 | PHOSPHONIC ACID | 1 | 71.6 |
| EXAMPLE 3 | PHOSPHONIC ACID | 0.05 | 71.1 |
| EXAMPLE 4 | PHOSPHINIC ACID | 0.2 | 86.4 |
| COMPARATIVE EXAMPLE 1 | NONE | 0 | 70.1 |

Laminated batteries as shown in FIGS. 2 and 3 were manufactured by the procedure described in each example below, and the performance of each battery was evaluated.

Example 5

Homogeneously mixed were 94 parts by weight of a lithium-cobalt mixed oxide $LiCoO_2$ as a cathode active material, 3 parts by weight of graphite as a conductive agent and 3 parts by weight of polyvinylidene fluoride PVdF as a binder, and N-methyl-2-pyrrolidone was added to the mixture to obtain a coating liquid of a cathode composite agent.

The coating liquid of the cathode composite agent obtained was homogeneously coated on both surfaces of an aluminum foil with a thickness of 20 μm, and was dried to form a layer of the cathode composite agent at a density of 40 mg/cm$^2$ per one surface. The foil was cut into a size of 50 mm in the width and 300 mm in the length as a cathode, to which a cathode terminal was attached.

Then, 97 parts of graphite as an anode active material and 3 parts by weight of PVdF as a binder were homogeneously mixed, and N-methyl-2-pyrrolidone was added to the mixture to obtain a coating liquid of an anode composite agent. The coating liquid of the anode composite agent obtained was homogeneously applied on both surfaces of a copper foil with a thickness of 15 μm that serves as an anode current collector, and was dried to obtain a layer of the anode composite agent at a density of 20 mg/cm$^2$ per one face. An anode was manufactured by cutting the foil into a size with a width of 50 mm and a length of 300 mm, and an anode terminal was attached to the anode.

A mixture of ethylene carbonate, propylene carbonate, diethyl carbonate, vinylene carbonate, lithium hexafluorophosphate and phosphonic acid in a proportion of 26:9:51.8:1:12:0.2 (weight ratio) was used as the nonaqueous electrolyte composition.

The cathode and anode were laminated with interposition of a separator made of a micro-porous polyethylene film with a thickness of 20 μm, and the laminate was coiled and was placed into a bag as an example of an outer package member made of a aluminum laminate film. The nonaqueous electrolyte composition (2 g) was injected into the bag, and the bag was fused by heating to obtain a laminated secondary battery of this example. The capacity of this battery was 700 mAh.

After charging the battery at 23° C. with 700 mA at a voltage of 4.2 V as an upper limit, the change in thickness of the battery after storing at 90° C. for 4 hours was measured as an amount of swelling. The results obtained are shown in Table 2.

The results show that the amount of swelling after storage at 90° C. for 4 hours was improved as compared with the results in Comparative Examples 2 to 4 by using the compound having the P—H bond.

Example 6

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and succinic anhydride in a proportion of 26:9:51.6:1:12:0.2:0.2 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic acid anhydride together as compared with the results of Comparative Examples 2 to 4 as well as the results of Example 5.

Example 7

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and glutaric acid anhydride in a proportion of 26:9:51.6:1:12:0.2:0.2 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic acid anhydride together as compared with the results of Comparative Examples 2 to 4 as well as the results of Example 5.

Example 8

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and maleic acid anhydride in a proportion of 26:9:51.6:1:12:0.2:0.2 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic acid anhydride together as compared with the results of Comparative Examples 2 to 4 as well as the results of Example 5.

Example 9

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and phthalic acid anhydride in a proportion of 26:9:51.6:1:12:0.2:0.2 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic acid anhydride together as compared with the results of Comparative Examples 2 to 4 as well as the results of Example 5.

Example 10

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and 1,3-propane sultone in a proportion of 26:9:51.5:1:12:0.2:0.3 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic sulphonate ester together as compared with the results of Comparative Examples 2 to 4 as well as the results of Example 5.

Example 11

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and 1,3-propene sultone in a proportion of 26:9:51.5:1:12:0.2:0.3 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic sulphonate ester together as compared with the results of Comparative Examples 2 to 4 as well as the results of Example 5.

Example 12

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and toluene sultone in a proportion of 26:9:51.5:1:12:0.2:0.3 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic sulphonate ester together as compared with the results of Comparative Examples 2 to 4 as well as the results of Example 5.

Example 13

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and divinyl sulfone in a proportion of 26:9:51.5:1:12:0.2:0.3 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and unsaturated sulfone together as compared with the results of Comparative Examples 2 to 4 as well as the results of Example 5.

Example 14

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and methylvinyl sulfone in a proportion of 26:9:51.5:1:12:0.2:0.3 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and unsaturated sulfone together as compared with the results of Comparative Examples 2 to 4 as well as the results of Example 5.

Example 15

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and γ-butyrolactone in a proportion of 26:9:48.8:1:12:0.2:3 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic carboxylate ester together as compared with the results of Comparative Examples 2 to 4 as well as the results of Example 5.

Example 16

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and δ-valerolactone in a proportion of 26:9:50.8:1:12:0.2:1 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic carboxylate ester together as compared with the results of Comparative Examples 2 to 4 as well as the results of Example 5.

Example 17

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and ethylene ethyl phosphate in a proportion of 26:9:51.3:1:12:0.2:0.5 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic phosphate ester together as compared with the results of Comparative Examples 2 to 4 as well as the results of Example 5.

Example 18

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and ethylene methyl phosphate in a proportion of 26:9:51.3:1:12:0.2:0.5 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic phosphate ester together as compared with the results of Comparative Examples 2 to 4 as well as the results of Example 5.

Example 19

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and succinic acid anhydride in a proportion of 26:9:51.6:1:12:0.2:0.2 (weight ratio) was used as the nonaqueous electrolyte composition. The amount of swelling was also measured as described above. The results obtained are shown in Table 2.

The results show that the amount of swelling after storing at 90° C. for 4 hours was improved by using the compound having the P—H bond and cyclic acid anhydride together as compared with the results of Comparative Examples 2 to 4 as well as the results of Example 5.

Comparative Example 2

A laminated secondary battery of this example was obtained by repeating the same procedure as in Example 5, except that a mixture of ethylene carbonate, propylene carbonate, diethyl carbonate, vinylene carbonate, lithium hexafluorophosphate and succinic acid anhydride in a proportion of 26:9:51.8:1:12:0.2 (weight ratio) was used as the nonaqueous electrolyte composition. The amount of swelling was also measured as described above. The results obtained are shown in Table 2.

The results show that the amount of swelling after storing at 90° C. for 4 hours was larger than those in Examples 5 to 19 when the compound having the P—H bond was not added.

Comparative Example 3

A laminated secondary battery of this example was obtained by repeating the same procedure as in Example 5, except that a mixture of ethylene carbonate, propylene carbonate, diethyl carbonate, vinylene carbonate, lithium hexafluorophosphate and 1,3-propane sultone in a proportion of 26:9:51.7:1:12:0.3 (weight ratio) was used as the nonaqueous electrolyte composition. The amount of swelling was also measured as described above. The results obtained are shown in Table 2.

The results show that the amount of swelling after storing at 90° C. for 4 hours was larger than those in Examples 5 to 19 when the compound having the P—H bond was not added.

Comparative Example 4

A laminated secondary battery of this example was obtained by repeating the same procedure as in Example 5, except that a mixture of ethylene carbonate, propylene carbonate, diethyl carbonate, vinylene carbonate and lithium hexafluorophosphate in a proportion of 26:9:52:1:12 (weight ratio) was used as the nonaqueous electrolyte composition. The amount of swelling was also measured as described above. The results obtained are shown in Table 2.

The results show that the amount of swelling after storing at 90° C. for 4 hours was larger than those in Examples 5 to 19 when the compound having the P—H bond and the cyclic acid anhydride were not added.

TABLE 2

| | COMPOUND HAVING P—H BOND | | CYCLIC ACID ANHYDRIDE, UNSATURATED SULFONE, CYCLIC SULFONIC ACID ESTER, CYCLIC CARBOXYLIC ACID ESTER OR CYCLIC PHOSPHORIC ACID ESTER | | AMOUNT OF |
|---|---|---|---|---|---|
| | TYPE | CONCENTRATION(%) | TYPE | CONCENTRATION(%) | SWELLING (mm) |
| EXAMPLE 5 | PHOSPHONIC ACID | 0.2 | NONE | 0 | 0.47 |
| EXAMPLE 6 | PHOSPHONIC ACID | 0.2 | SUCCINIC ACID ANHYDRIDE | 0.2 | 0.31 |
| EXAMPLE 7 | PHOSPHONIC ACID | 0.2 | GLUTARIC ACID ANHYDRIDE | 0.2 | 0.27 |
| EXAMPLE 8 | PHOSPHONIC ACID | 0.2 | MALEIC ACID ANHYDRIDE | 0.2 | 0.33 |
| EXAMPLE 9 | PHOSPHONIC ACID | 0.2 | PHTHALIC ACID ANHYDRIDE | 0.2 | 0.36 |
| EXAMPLE 10 | PHOSPHONIC ACID | 0.2 | 1,3-PROPANE SULTONE | 0.3 | 0.41 |
| EXAMPLE 11 | PHOSPHONIC ACID | 0.2 | 1,3-PROPENE SULTONE | 0.3 | 0.26 |
| EXAMPLE 12 | PHOSPHONIC ACID | 0.2 | TOLUENE SULTONE | 0.3 | 0.36 |
| EXAMPLE 13 | PHOSPHONIC ACID | 0.2 | DIVINYL SULFONE | 0.3 | 0.43 |
| EXAMPLE 14 | PHOSPHONIC ACID | 0.2 | METHYLVINYL SULFONE | 0.3 | 0.46 |
| EXAMPLE 15 | PHOSPHONIC ACID | 0.2 | γ-BUTYROLACTONE | 3 | 0.14 |
| EXAMPLE 16 | PHOSPHONIC ACID | 0.2 | δ-VALEROLACTONE | 1 | 0.09 |
| EXAMPLE 17 | PHOSPHONIC ACID | 0.2 | ETHYLENEETHYL PHOSPHATE | 0.5 | 0.12 |
| EXAMPLE 18 | PHOSPHONIC ACID | 0.2 | ETHYLENEMETHYL PHOSPHATE | 0.5 | 0.16 |
| EXAMPLE 19 | PHOSPHINIC ACID | 0.2 | SUCCINIC ACID ANHYDRIDE | 0.2 | 0.34 |
| COMPARATIVE EXAMPLE 2 | NONE | 0 | SUCCINIC ACID ANHYDRIDE | 0.2 | 1.02 |
| COMPARATIVE EXAMPLE 3 | NONE | 0 | 1,3-PROPANE SULTONE | 0.3 | 0.99 |
| COMPARATIVE EXAMPLE 4 | NONE | 0 | NONE | 0 | 1.18 |

Example 20

A laminated secondary battery of this example was obtained by repeating the same procedure as in Example 5, except that a mixture of ethylene carbonate, propylene carbonate, diethyl carbonate, vinylene carbonate, lithium hexafluorophosphate and phosphonic acid in a proportion of 26:9:50.8:1:12:0.2 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 when the compound having the P—H bond was used.

Example 21

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and succinic acid anhydride in a proportion of 26:9:50.6:1:12:0.2:0.2 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic acid anhydride were used together.

Example 22

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and glutaric acid anhydride in a proportion of 26:9:50.6:1:12:0.2:0.2 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic acid anhydride were used together.

Example 23

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and maleic acid anhydride in a proportion of 26:9:50.6:1:12:0.2:0.2 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic acid anhydride were used together.

Example 24

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and phthalic acid anhydride in a proportion of 26:9:50.6:1:12:0.2:0.2 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic acid anhydride were used together.

Example 25

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and 1,3-propane sultone in a proportion of 26:9:50.5:1:12:0.2:0.3 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic sulfonate ester were used together.

Example 26

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and 1,3-propene sultone in a proportion of 26:9:50.5:1:12:0.2:0.3 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic sulfonate ester were used together.

Example 27

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and toluene sultone in a proportion of 26:9:50.5:1:12:0.2:0.3 (weight ratio), which was swelled by further adding polyvinyl formal so that the concentration in the nonaqueous electrolyte composition is 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic sulfonate ester were used together.

Example 28

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and divinyl sultone in a proportion of 26:9:50.5:1:12:0.2:0.3 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the unsaturated sulfone were used together.

Example 29

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and methylvinyl sulfone in a proportion of 26:9:50.5:1:12:0.2:0.3 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the unsaturated sulfone were used together.

Example 30

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and γ-butyrolactone in a proportion of 26:9:47.8:1:12:0.2:3 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic carboxylate ester were used together.

Example 31

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and δ-valerolactone in a proportion of 26:9:49.8:1:12:0.2:1 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic carboxylate ester were used together.

Example 32

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and ethylene ethyl phosphate in a proportion of 26:9:50.3:1:12:0.2:0.5 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic phosphate ester were used together.

Example 33

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphonic acid and ethylene methyl phosphate in a proportion of 26:9:50.3:1:12:0.2:0.5 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic phosphate ester were used together.

Example 34

A laminated secondary battery of this example was obtained by repeating the same procedure as in Example 5, except that a mixture of ethylene carbonate, propylene carbonate, diethyl carbonate, vinylene carbonate, lithium hexafluorophosphate, phosphinic acid and succinic acid anhydride in a proportion of 26:9:50.6:1:12:0.2:0.2 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was improved as compared with Comparative Examples 5 to 7 as well as Example 20 when the compound having the P—H bond and the cyclic acid anhydride were used together.

Comparative Example 5

A laminated secondary battery of this example was obtained by repeating the same procedure as in Example 5, except that a mixture of ethylene carbonate, propylene carbonate, diethyl carbonate, vinylene carbonate, lithium hexafluorophosphate, and succinic acid anhydride in a proportion of 26:9:50.8:1:12:0.2 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was larger than those in Examples 20 to 34 when the compound having the P—H bond was not added.

Comparative Example 6

A laminated secondary battery of this example was obtained by repeating the same procedure as in Example 5, except that a mixture of ethylene carbonate, propylene carbonate, diethyl carbonate, vinylene carbonate, lithium hexafluorophosphate, and 1,3-propane sultone in a proportion of 26:9:50.7:1:12:0.3 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was larger than those in Examples 20 to 34 when the compound having the P—H bond was not added.

Comparative Example 7

A laminated secondary battery of this example was obtained by repeating the same procedure as in Example 5, except that a mixture of ethylene carbonate, propylene carbonate, diethyl carbonate, vinylene carbonate and lithium hexafluorophosphate in a proportion of 26:9:51:1:12 (weight ratio), which was swelled by further adding polyvinyl formal so that the concentration in the nonaqueous electrolyte composition was 1%, was used as the nonaqueous electrolyte composition. The amount of swelling was also measured as described above. The results obtained are shown in Table 3.

The results show that the amount of swelling after storing at 90° C. for 4 hours was larger than those in Examples 20 to 34 when the compound having the P—H bond and the cyclic acid anhydride were not added.

Example 50

A laminated secondary battery of this example was obtained by repeating the same procedure as in Example 40, except that phosphinic acid was used in place of phosphonic acid used in Example 40. The amount of swelling was also measured as described above. The results obtained are shown in Table 4.

TABLE 3

| | COMPOUND HAVING P—H BOND | | CYCLIC ACID ANHYDRIDE, UNSATURATED SULFONE, CYCLIC SULFONIC ACID ESTER, CYCLIC CARBOXYLIC ACID ESTER OR CYCLIC PHOSPHORIC ACID ESTER | | AMOUNT |
|---|---|---|---|---|---|
| | TYPE | CONCENTRATION(%) | TYPE | CONCENTRATION(%) | OF SWELLING (mm) |
| EXAMPLE 20 | PHOSPHONIC ACID | 0.2 | NONE | 0 | 0.59 |
| EXAMPLE 21 | PHOSPHONIC ACID | 0.2 | SUCCINIC ACID ANHYDRIDE | 0.2 | 0.39 |
| EXAMPLE 22 | PHOSPHONIC ACID | 0.2 | GLUTARIC ACID ANHYDRIDE | 0.2 | 0.34 |
| EXAMPLE 23 | PHOSPHONIC ACID | 0.2 | MALEIC ACID ANHYDRIDE | 0.2 | 0.41 |
| EXAMPLE 24 | PHOSPHONIC ACID | 0.2 | PHTHALIC ACID ANHYDRIDE | 0.2 | 0.45 |
| EXAMPLE 25 | PHOSPHONIC ACID | 0.2 | 1,3-PROPANE SULTONE | 0.3 | 0.53 |
| EXAMPLE 26 | PHOSPHONIC ACID | 0.2 | 1,3-PROPENE SULTONE | 0.3 | 0.33 |
| EXAMPLE 27 | PHOSPHONIC ACID | 0.2 | TOLUENE SULTONE | 0.3 | 0.45 |
| EXAMPLE 28 | PHOSPHONIC ACID | 0.2 | DIVINYL SULFONE | 0.3 | 0.55 |
| EXAMPLE 29 | PHOSPHONIC ACID | 0.2 | METHYLVINYL SULFONE | 0.3 | 0.58 |
| EXAMPLE 30 | PHOSPHONIC ACID | 0.2 | γ-BUTYROLACTONE | 3 | 0.18 |
| EXAMPLE 31 | PHOSPHONIC ACID | 0.2 | δ-VALEROLACTONE | 1 | 0.12 |
| EXAMPLE 32 | PHOSPHONIC ACID | 0.2 | ETHYLENEETHYL PHOSPHATE | 0.5 | 0.15 |
| EXAMPLE 33 | PHOSPHONIC ACID | 0.2 | ETHYLENEMETHYL PHOSPHATE | 0.5 | 0.21 |
| EXAMPLE 34 | PHOSPHINIC ACID | 0.2 | SUCCINIC ACID ANHYDRIDE | 0.2 | 0.43 |
| COMPARATIVE EXAMPLE 5 | NONE | 0 | SUCCINIC ACID ANHYDRIDE | 0.2 | 1.28 |
| COMPARATIVE EXAMPLE 6 | NONE | 0 | 1,3-PROPANE SULTONE | 0.3 | 1.24 |
| COMPARATIVE EXAMPLE 7 | NONE | 0 | NONE | 0 | 1.48 |

Examples 35 to 49

Laminated secondary batteries of these examples were obtained by repeating the same procedures as in Examples 20 to 34, respectively, except that polyacrylate ester was used in place of polyvinyl formal used in Examples 20 to 34. The amount of swelling was also measured as described above. The results obtained are shown in Table 4.

It is found that the amount of swelling after storing at 90° C. for 4 hours was improved as compared with Comparative Examples 8 to 10, when the compound having the P—H bond was used as in Examples 35 to 49. It is also found that the amount of swelling after storing at 90° C. for 4 hours was improved as compared with Comparative Examples 8 to 10 as well as Example 35, when the compound having the P—H bond and the cyclic acid anhydride, etc. were used together as in Examples 36 to 49.

It is found that the amount of swelling after storing at 90° C. for 4 hours was improved as compared with Comparative Examples 8 to 10 as well as in Example 35, when the compound having the P—H bond and the cyclic sulfonate ester were used together.

Comparative Examples 8 to 10

Laminated secondary batteries of these examples were obtained by repeating the same procedure as in Comparative Examples 5 to 7, respectively, except that polyacrylate ester was used in place of polyvinyl formal used in Comparative Examples 5 to 7. The amount of swelling was also measured as described above. The results obtained are shown in Table 4.

It is found that the amount of swelling after storing at 90° C. for 4 hours was larger than those in Examples 35 to 50, when the compound having the P—H bond was not added as in Comparative Examples 8 and 9, or when the compound having the P—H bond and the cyclic acid anhydride, etc. were not added as in Comparative Example 10.

TABLE 4

| | COMPOUND HAVING P—H BOND | | CYCLIC ACID ANHYDRIDE, UNSATURATED SULFONE, CYCLIC SULFONIC ACID ESTER, CYCLIC CARBOXYLIC ACID ESTER OR CYCLIC PHOSPHORIC ACID ESTER | | AMOUNT |
|---|---|---|---|---|---|
| | TYPE | CONCENTRATION(%) | TYPE | CONCENTRATION(%) | OF SWELLING (mm) |
| EXAMPLE 35 | PHOSPHONIC ACID | 0.2 | NONE | 0 | 0.53 |
| EXAMPLE 36 | PHOSPHONIC ACID | 0.2 | SUCCINIC ACID ANHYDRIDE | 0.2 | 0.35 |
| EXAMPLE 37 | PHOSPHONIC ACID | 0.2 | GLUTARIC ACID ANHYDRIDE | 0.2 | 0.30 |
| EXAMPLE 38 | PHOSPHONIC ACID | 0.2 | MALEIC ACID ANHYDRIDE | 0.2 | 0.37 |
| EXAMPLE 39 | PHOSPHONIC ACID | 0.2 | PHTHALIC ACID ANHYDRIDE | 0.2 | 0.40 |
| EXAMPLE 40 | PHOSPHONIC ACID | 0.2 | 1,3-PROPANE SULTONE | 0.3 | 0.47 |
| EXAMPLE 41 | PHOSPHONIC ACID | 0.2 | 1,3-PROPENE SULTONE | 0.3 | 0.30 |
| EXAMPLE 42 | PHOSPHONIC ACID | 0.2 | TOLUENE SULTONE | 0.3 | 0.40 |
| EXAMPLE 43 | PHOSPHONIC ACID | 0.2 | DIVINYL SULFONE | 0.3 | 0.50 |
| EXAMPLE 44 | PHOSPHONIC ACID | 0.2 | METHYLVINYL SULFONE | 0.3 | 0.52 |
| EXAMPLE 45 | PHOSPHONIC ACID | 0.2 | γ-BUTYROLACTONE | 3 | 0.16 |
| EXAMPLE 46 | PHOSPHONIC ACID | 0.2 | δ-VALEROLACTONE | 1 | 0.11 |
| EXAMPLE 47 | PHOSPHONIC ACID | 0.2 | ETHYLENEETHYL PHOSPHATE | 0.5 | 0.13 |
| EXAMPLE 48 | PHOSPHONIC ACID | 0.2 | ETHYLENEMETHYL PHOSPHATE | 0.5 | 0.19 |
| EXAMPLE 49 | PHOSPHINIC ACID | 0.2 | SUCCINIC ACID ANHYDRIDE | 0.2 | 0.38 |
| EXAMPLE 50 | PHOSPHINIC ACID | 0.2 | 1,3-PROPANE SULTONE | 0.3 | 0.61 |
| COMPARATIVE EXAMPLE 8 | NONE | 0 | SUCCINIC ACID ANHYDRIDE | 0.2 | 1.14 |
| COMPARATIVE EXAMPLE 9 | NONE | 0 | 1,3-PROPANE SULTONE | 0.3 | 1.10 |
| COMPARATIVE EXAMPLE 10 | NONE | 0 | NONE | 0 | 1.32 |

Examples 51 to 65

Laminated secondary batteries of these examples were obtained by repeating the same procedures as in Examples 5 to 19, respectively, except that a separator prepared by applying polyvinylidene fluoride at a thickness of 2 μm on both surfaces of a micro-porous polyethylene film with a thickness of 10 μm was used in place of the separator made of the micro-porous polyethylene film with a thickness of 20 μm used in Examples 5 to 19. The amount of swelling was also measured as described above. The results obtained are shown in Table 5.

It is found that the amount of swelling after storing at 90° C. for 4 hours was improved as compared with Comparative Examples 11 to 13, when the compound having the P—H bond was used as in Examples 51 to 65. It is also found that the amount of swelling after storing at 90° C. for 4 hours was improved as compared with Comparative Examples 11 to 13 as well as Example 51, when the compound having the P—H bond and the cyclic acid anhydride, etc. were used as in Examples 52 to 65.

Comparative Examples 11 to 13

Laminated secondary batteries of these examples were obtained by repeating the same procedure as in Comparative Examples 2 to 4, respectively, except that a separator prepared by applying polyvinylidene fluoride at a thickness of 2 μm on both surfaces of a micro-porous polyethylene film with a thickness of 10 μm was used in place of the separator made of the micro-porous polyethylene film with a thickness of 20 μm used in Comparative Examples 2 to 4. The amount of swelling was also measured as described above. The results obtained are shown in Table 5.

It is found that the amount of swelling after storing at 90° C. for 4 hours was larger than those in Examples 51 to 65, when the compound having the P—H bond was not added as in Comparative Examples 11 and 12, or when the compound having the P—H bond and the cyclic acid anhydride, etc. were not added as in Comparative Example 13.

TABLE 5

| | COMPOUND HAVING P—H BOND | | CYCLIC ACID ANHYDRIDE, UNSATURATED SULFONE, CYCLIC SULFONIC ACID ESTER, CYCLIC CARBOXYLIC ACID ESTER OR CYCLIC PHOSPHORIC ACID ESTER | | AMOUNT OF SWELLING (mm) |
|---|---|---|---|---|---|
| | TYPE | CONCENTRATION(%) | TYPE | CONCENTRATION(%) | |
| EXAMPLE 51 | PHOSPHONIC ACID | 0.2 | NONE | 0 | 0.19 |
| EXAMPLE 52 | PHOSPHONIC ACID | 0.2 | SUCCINIC ACID ANHYDRIDE | 0.2 | 0.12 |
| EXAMPLE 53 | PHOSPHONIC ACID | 0.2 | GLUTARIC ACID ANHYDRIDE | 0.2 | 0.11 |
| EXAMPLE 54 | PHOSPHONIC ACID | 0.2 | MALEIC ACID ANHYDRIDE | 0.2 | 0.13 |
| EXAMPLE 55 | PHOSPHONIC ACID | 0.2 | PHTHALIC ACID ANHYDRIDE | 0.2 | 0.14 |
| EXAMPLE 56 | PHOSPHONIC ACID | 0.2 | 1,3-PROPANE SULTONE | 0.3 | 0.20 |
| EXAMPLE 57 | PHOSPHONIC ACID | 0.2 | 1,3-PROPENE SULTONE | 0.3 | 0.11 |
| EXAMPLE 58 | PHOSPHONIC ACID | 0.2 | TOLUENE SULTONE | 0.3 | 0.14 |
| EXAMPLE 59 | PHOSPHONIC ACID | 0.2 | DIVINYL SULFONE | 0.3 | 0.25 |
| EXAMPLE 60 | PHOSPHONIC ACID | 0.2 | METHYLVINYL SULFONE | 0.3 | 0.26 |
| EXAMPLE 61 | PHOSPHONIC ACID | 0.2 | γ-BUTYROLACTONE | 3 | 0.06 |
| EXAMPLE 62 | PHOSPHONIC ACID | 0.2 | δ-VALEROLACTONE | 1 | 0.04 |
| EXAMPLE 63 | PHOSPHONIC ACID | 0.2 | ETHYLENEETHYL PHOSPHATE | 0.5 | 0.05 |
| EXAMPLE 64 | PHOSPHONIC ACID | 0.2 | ETHYLENEMETHYL PHOSPHATE | 0.5 | 0.07 |
| EXAMPLE 65 | PHOSPHINIC ACID | 0.2 | SUCCINIC ACID ANHYDRIDE | 0.2 | 0.14 |
| COMPARATIVE EXAMPLE 11 | NONE | 0 | SUCCINIC ACID ANHYDRIDE | 0.2 | 0.41 |
| COMPARATIVE EXAMPLE 12 | NONE | 0 | 1,3-PROPANE SULTONE | 0.3 | 0.39 |
| COMPARATIVE EXAMPLE 13 | NONE | 0 | NONE | 0 | 0.47 |

Example 66

Homogeneously mixed were 94 parts by weight of a lithium-cobalt composite oxide $LiCoO_2$ as a cathode active material, 3 parts by weight of graphite as a conductive agent and 3 parts by weight of polyvinylidene fluoride PVdF as a binder, and N-methyl-2-pyrrolidone was added to the mixture to obtain a coating liquid of a cathode composite agent.

Then, the coating liquid of the cathode composite agent obtained was homogeneously applied on both surfaces of an aluminum foil with a thickness of 20 μm, and was dried to form a layer of the cathode composite agent at a density of 40 mg/cm² per one surface. A cathode was manufactured by cutting the foil into a size with a width of 50 mm and a length of 300 mm, and a cathode terminal was attached to the cathode.

Homogeneously mixed were 97 parts by weight of graphite as an anode active material and 3 parts by weight of PVdF as a binder, and N-methyl-2-pyrrolidone was added to the mixture to obtain a coating liquid of an anode composite agent. Subsequently, the coating liquid of the anode composite agent obtained was homogeneously applied on both surfaces of a copper foil with a thickness of 15 μm, and was dried to form a layer of the anode composite agent at a density of 20 mg/cm² per one surface. An anode was manufactured by cutting the foil into a size with a width of 50 mm and a length of 300 mm, and an anode terminal was attached to the anode.

A mixture of ethylene carbonate, propylene carbonate, ethylmethyl carbonate, diethyl carbonate, vinylene carbonate, lithium hexafluorophosphate and phenyl phosphinic acid in a proportion of 16:9:34:25.5:1:14:0.5 (weight ratio) was used as the nonaqueous electrolyte composition.

The cathode and anode were laminated with interposition of a separator made of a microporous polyethylene film with a thickness of 12 μm, and the laminate was coiled. The coiled electrode was packaged in a bag as an example of the outer package member made of an aluminum laminate film. After injecting 2 g of the nonaqueous electrolyte composition, the bag was fused by heating to obtain a laminated secondary battery of this example. The capacity of this battery was 700 mAh.

The battery was charged at 23° C. for 3 hours with a current of 700 mA at a voltage of 4.2 V as an upper limit, and a discharge capacity was measured after repeating 300 cycles of charge-discharge with a current of 700 mAh up to 3.0 V. The discharge capacity maintenance factor relative to the initial discharge capacity was calculated. The results obtained are shown in Table 6.

The results show that the discharge capacity maintenance factor after repeating the charge-discharge cycles at 23° C. was improved as compared with Comparative Example 14 when the compound having the P—C bond was used.

Example 67

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and phenyl phosphonic acid in a proportion of 16:9:34:24:1:14:2 (weight ratio) was used as the nonaqueous electrolyte composition. The discharge capacity maintenance factor was calculated as described above. The results obtained are shown in Table 6.

The results show that the discharge capacity maintenance factor after repeating the charge-discharge cycles at 23° C. was improved as compared with Comparative Example 14 when the compound having the P—C bond was used.

Example 68

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and phenyl phosphinic acid in a proportion of 16:9:34:25.9:1:14:0.1 (weight ratio) was used as the nonaqueous electrolyte composition. The discharge capacity maintenance factor was calculated as described above. The results obtained are shown in Table 6.

The results show that the discharge capacity maintenance factor after, repeating the charge-discharge cycles at 23° C. was improved as compared with Comparative Example 14 when the compound having the P—C bond was used.

Example 69

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and vinyl phosphonic acid in a proportion of 16:9:34:25.5:1:14:0.5 (weight ratio) was used as the nonaqueous electrolyte composition. The discharge capacity maintenance factor was calculated as described above. The results obtained are shown in Table 6.

The results show that the discharge capacity maintenance factor after repeating the charge-discharge cycles at 23° C. was improved as compared with Comparative Example 14 when the compound having the P—C bond was used.

Example 70

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and phenyl phosphonic acid in a proportion of 16:9:34:25.5:1:14:0.5 (weight ratio) was used as the nonaqueous electrolyte composition. The discharge capacity maintenance factor was calculated as described above. The results obtained are shown in Table 6.

The results show that the discharge capacity maintenance factor after repeating the charge-discharge cycles at 23° C. was improved as compared with Comparative Example 14 when the compound having the P—C bond was used.

Example 71

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and diphenyl phosphonic acid in a proportion of 16:9:34:25.5:1:14:0.5 (weight ratio) was used as the nonaqueous electrolyte composition. The discharge capacity maintenance factor was calculated as described above. The results obtained are shown in Table 6.

The results show that the discharge capacity maintenance factor after repeating the charge-discharge cycles at 23° C. was improved as compared with Comparative Example 14 when the compound having the P—C bond was used.

Comparative Example 14

A laminated secondary battery of this example was obtained by repeating the procedure as in Example 66, except that a mixture of ethylene carbonate, propylene carbonate, ethylmethyl carbonate, diethyl carbonate, vinylene carbonate and lithium hexafluorophosphate in a proportion of 16:9:34:26:1:14 (weight ratio) was used as the nonaqueous electrolyte composition. The discharge capacity maintenance factor was calculated as described above. The results obtained are shown in Table 6.

Table 6 shows that the discharge capacity maintenance factor after repeating the charge-discharge cycles at 23° C. was inferior to the values in Examples 66 to 71 when the compound having the P—C bond was not used.

TABLE 6

|  | COMPOUND HAVING P—C BOND | | DISCHARGE CAPACITY MAINTENANCE FACTOR |
|---|---|---|---|
|  | TYPE | CONCENTRATION(%) | AFTER 300 CYCLES(%) |
| EXAMPLE 66 | PHENYL PHOSPHINIC ACID | 0.5 | 87.4 |
| EXAMPLE 67 | PHENYL PHOSPHINIC ACID | 2 | 82.3 |
| EXAMPLE 68 | PHENYL PHOSPHINIC ACID | 0.1 | 81.7 |
| EXAMPLE 69 | VINYL PHOSPHONIC ACID | 0.5 | 84.8 |
| EXAMPLE 70 | PHENYL PHOSPHONIC ACID | 0.5 | 86.4 |
| EXAMPLE 71 | DIPHENYL PHOSPHONIC ACID | 0.5 | 85.7 |

TABLE 6-continued

| | COMPOUND HAVING P—C BOND | | DISCHARGE CAPACITY MAINTENANCE FACTOR |
|---|---|---|---|
| | TYPE | CONCENTRATION(%) | AFTER 300 CYCLES(%) |
| COMPARATIVE EXAMPLE 14 | NONE | 0 | 81.5 |

Example 72

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and phenyl phosphinic acid in a proportion of 16:9:34:24.5:1:14:0.5 (weight ratio), which was swelled by adding polyvinyl formal so that the concentration in the nonaqueous electrolyte composition was 1%, was used as the nonaqueous electrolyte composition. The discharge capacity maintenance factor was calculated as described above. The results obtained are shown in Table 7.

The results show that the discharge capacity maintenance factor after repeating the charge-discharge cycles at 23° C. was improved as compared with Comparative Example 15 when the compound having the P—C bond was used.

Example 73

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and phenyl phosphinic acid in a proportion of 16:9:34:23:1:14:2 (weight ratio), which was swelled by adding polyvinyl formal so that the concentration in the nonaqueous electrolyte composition was 1%, was used as the nonaqueous electrolyte composition. The discharge capacity maintenance factor was calculated as described above. The results obtained are shown in Table 7.

The results show that the discharge capacity maintenance factor after repeating the charge-discharge cycles at 23° C. was improved as compared with Comparative Example 15 when the compound having the P—C bond was used.

Example 74

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and phenyl phosphinic acid in a proportion of 16:9:34:24.9:1:14:0.1 (weight ratio), which was swelled by adding polyvinyl formal so that the concentration in the nonaqueous electrolyte composition was 1%, was used as the nonaqueous electrolyte composition. The discharge capacity maintenance factor was calculated as described above. The results obtained are shown in Table 7.

The results show that the discharge capacity maintenance factor after repeating the charge-discharge cycles at 23° C. was improved as compared with Comparative Example 15 when the compound having the P—C bond was used.

Example 75

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and vinyl phosphonic acid in a proportion of 16:9:34:24.5:1:14:0.5 (weight ratio), which was swelled by adding polyvinyl formal so that the concentration in the nonaqueous electrolyte composition was 1%, was used as the nonaqueous electrolyte composition. The discharge capacity maintenance factor was calculated as described above. The results obtained are shown in Table 7.

The results show that the discharge capacity maintenance factor after repeating the charge-discharge cycles at 23° C. was improved as compared with Comparative Example 15 when the compound having the P—C bond was used.

Example 76

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and phenyl phosphonic acid in a proportion of 16:9:34:24.5:1:14:0.5 (weight ratio), which was swelled by adding polyvinyl formal so that the concentration in the nonaqueous electrolyte composition was 1%, was used as the nonaqueous electrolyte composition. The discharge capacity maintenance factor was calculated as described above. The results obtained are shown in Table 7.

The results show that the discharge capacity maintenance factor after repeating the charge-discharge cycles at 23° C. was improved as compared with Comparative Example 15 when the compound having the P—C bond was used.

Example 77

A laminated secondary battery of this example was obtained by repeating the procedure as in Example 66, except that a mixture of ethylene carbonate, propylene carbonate, ethylmethyl carbonate, diethyl carbonate, vinylene carbonate, lithium hexafluorophosphate and diphenyl phosphonic acid in a proportion of 16:9:34:24.5:1:14:0.5 (weight ratio), which was swelled by adding polyvinyl formal so that the concentration in the nonaqueous electrolyte composition was 1%, was used as the nonaqueous electrolyte composition. The discharge capacity maintenance factor was calculated as described above. The results obtained are shown in Table 7.

The results show that the discharge capacity maintenance factor after repeating the charge-discharge cycles at 23° C. was improved as compared with Comparative Example 15 when the compound having the P—C bond was used.

Comparative Example 15

A laminated secondary battery of this example was obtained by repeating the procedure as in Example 66, except that a mixture of ethylene carbonate, propylene carbonate, ethylmethyl carbonate, diethyl carbonate, vinylene carbonate and lithium hexafluorophosphate in a proportion of 16:9:34:

25:1:14 (weight ratio), which was swelled by adding polyvinyl formal so that the concentration in the nonaqueous electrolyte composition was 1%, was used as the nonaqueous electrolyte composition. The discharge capacity maintenance factor was calculated as described above. The results obtained are shown in Table 7.

Table 7 shows that the discharge capacity maintenance factor after repeating the charge-discharge cycles at 23° C. was inferior to the values in Examples 72 to 77 when the compound having the P—C bond was not used.

was improved as compared with Comparative Example 16 when the compound having the P—C bond was used as in Examples 78 to 83.

Comparative Example 16

A laminated secondary battery of this example was obtained by repeating the same procedure as in Comparative Example 15, except that polyacrylate ester was used in place of polyvinyl formal used in Comparative Example 15. The discharge capacity maintenance factor was calculated as described above. The results obtained are shown in Table 8.

TABLE 7

|  | COMPOUND HAVING P—C BOND | | DISCHARGE CAPACITY MAINTENANCE FACTOR |
| --- | --- | --- | --- |
|  | TYPE | CONCENTRATION(%) | AFTER 300 CYCLES(%) |
| EXAMPLE 72 | PHENYL PHOSPHINIC ACID | 0.5 | 82.3 |
| EXAMPLE 73 | PHENYL PHOSPHINIC ACID | 2 | 77.5 |
| EXAMPLE 74 | PHENYL PHOSPHINIC ACID | 0.1 | 77.0 |
| EXAMPLE 75 | VINYL PHOSPHONIC ACID | 0.5 | 79.9 |
| EXAMPLE 76 | PHENYL PHOSPHONIC ACID | 0.5 | 81.4 |
| EXAMPLE 77 | DIPHENYL PHOSPHONIC ACID | 0.5 | 80.7 |
| COMPARATIVE EXAMPLE 15 | NONE | 0 | 76.8 |

Examples 78 to 83

Laminated secondary batteries of these examples were obtained by repeating the same procedures as in Examples 72 to 77, respectively, except that polyacrylate ester was used in place of polyvinyl formal used in Examples 72 to 77. The discharge capacity maintenance factor was calculated as described above. The results obtained are shown in Table 8.

The results show that the discharge capacity maintenance factor after repeating the charge-discharge cycles at 23° C.

Table 8 shows that the discharge capacity maintenance factor after repeating the charge-discharge cycles at 23° C. was inferior to the values in Examples 78 to 83 when the compound having the P—C bond was not used.

TABLE 8

|  | COMPOUND HAVING P—C BOND | | DISCHARGE CAPACITY MAINTENANCE FACTOR |
| --- | --- | --- | --- |
|  | TYPE | CONCENTRATION(%) | AFTER 300 CYCLES(%) |
| EXAMPLE 78 | PHENYL PHOSPHINIC ACID | 0.5 | 84.8 |
| EXAMPLE 79 | PHENYL PHOSPHINIC ACID | 2 | 79.9 |
| EXAMPLE 80 | PHENYL PHOSPHINIC ACID | 0.1 | 79.3 |
| EXAMPLE 81 | VINYL PHOSPHONIC ACID | 0.5 | 82.3 |
| EXAMPLE 82 | PHENYL PHOSPHONIC ACID | 0.5 | 83.9 |
| EXAMPLE 83 | DIPHENYL PHOSPHONIC ACID | 0.5 | 83.2 |
| COMPARATIVE EXAMPLE 16 | NONE | 0 | 79.1 |

Example 84 to 89

Laminated secondary batteries of these examples were obtained by repeating the procedures in Examples 66 to 71, respectively, except that a separator prepared by applying polyvinylidene fluoride at a thickness of 2 μm on both surfaces of a micro-porous polyethylene film with a thickness of 7 μm was used in place of the separator made of the micro-porous polyethylene film with a thickness of 12 μm used in Examples 66 to 71. The discharge capacity maintenance factor was calculated as described above. The results obtained are shown in Table 9.

The results show that the discharge capacity maintenance factor after repeating the charge-discharge cycles at 23° C. was improved as compared with Comparative Example 17 when the compound having the P—C bond was used as in Examples 84 to 89.

Comparative Example 17

A laminated secondary battery of this example was obtained by repeating the procedure in Example 14, respectively except that a separator prepared by applying polyvinylidene fluoride at a thickness of 2 μm on both surfaces of a micro-porous polyethylene film with a thickness of 7 μm was used in place of the separator made of the micro-porous polyethylene film with a thickness of 12 μm used in Comparative Example 14. The discharge capacity maintenance factor was calculated as described above. The results obtained are shown in Table 9.

Table 9 shows that the discharge capacity maintenance factor after repeating the charge-discharge cycles at 23° C. was inferior to the values in Examples 84 to 89 when the compound having the P—C bond was not used.

While the battery using a cylindrical can as the outer package member 30 or the battery using films of the outer package member 30 has been described in the above-mentioned embodiments, embodiments may be also applied to a battery having a square, coiled or button shape using a can for its outer package member as well. The invention may be also applied to a primary battery as well as the secondary battery.

While certain embodiments relate to the battery using lithium as the reactive material of the electrode, it should be appreciated that batteries using alkali metals such as sodium Na and potassium K, alkali earth metals such as magnesium Mg and calcium Ca, and light metals such as aluminum Al may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte composition comprising:
   an electrolyte salt;
   a nonaqueous solvent; and
   a compound having a phosphorus-hydrogen bond or a phosphorus-carbon bond,
   wherein the compound having the phosphorus-hydrogen bond or phosphorus-carbon bond has hydrogen capable of being dissociated as a proton and is a phosphinic acid or an organic phosphinic acid.

2. The nonaqueous electrolyte composition according to claim 1, wherein the organic phosphinic acid is organic phosphinic acid having a carbon-carbon multiple bond.

TABLE 9

| | COMPOUND HAVING P—C BOND | | DISCHARGE CAPACITY MAINTENANCE FACTOR |
|---|---|---|---|
| | TYPE | CONCENTRATION(%) | AFTER 300 CYCLES(%) |
| EXAMPLE 84 | PHENYL PHOSPHINIC ACID | 0.5 | 90.1 |
| EXAMPLE 85 | PHENYL PHOSPHINIC ACID | 2 | 84.8 |
| EXAMPLE 86 | PHENYL PHOSPHINIC ACID | 0.1 | 84.2 |
| EXAMPLE 87 | VINYL PHOSPHONIC ACID | 0.5 | 87.4 |
| EXAMPLE 88 | PHENYL PHOSPHONIC ACID | 0.5 | 89.0 |
| EXAMPLE 89 | DIPHENYL PHOSPHONIC ACID | 0.5 | 88.3 |
| COMPARATIVE EXAMPLE 17 | NONE | 0 | 84.0 |

It should be understood by those skilled in the art that various modifications, combinations, sub-combinations and alterations may occur depending on design requirements and other factors insofar as they are within the scope of the appended claims or the equivalents thereof.

For example, the battery having the battery element 20 in which the cathode 21 and anode 22 are laminated and coiled. Embodiments are also applicable to a battery having a planar battery element in which a pair of cathode and anode was laminated, or to a battery having a laminated battery element in which a plurality of cathodes and anodes are laminated.

3. The nonaqueous electrolyte composition according to claim 1, wherein the organic phosphinic acid is phenyl phosphinic acid.

4. The nonaqueous electrolyte composition according to claim 1, wherein the content of the compound having the phosphorus-hydrogen bond or phosphorus-carbon bond ranges from 0.01 to 5%.

5. The nonaqueous electrolyte composition according to claim 1, further containing at least one kind selected from a cyclic acid anhydride, an unsaturated sulfone, a cyclic sulfonate ester, a cyclic carboxylate ester and a cyclic phosphate ester.

6. The nonaqueous electrolyte composition according to claim 5, wherein the cyclic acid anhydride is succinic acid anhydride and/or glutaric acid anhydride.

7. The nonaqueous electrolyte composition according to claim 5, wherein the unsaturated sulfone is divinyl sulfone.

8. The nonaqueous electrolyte composition according to claim 5, wherein the cyclic sulfonate ester is 1,3-propane sultone and/or 1,3-propene sultone.

9. The nonaqueous electrolyte composition according to claim 1, further containing carbonate ester having a carbon-carbon multiple bond.

10. The nonaqueous electrolyte composition according to claim 9, wherein the carbonate ester having the carbon-carbon multiple bond is vinylene carbonate.

11. The nonaqueous electrolyte composition according to claim 1, further comprising a polymer compound.

12. The nonaqueous electrolyte composition according to claim 11, wherein the polymer compound is at least one kind selected from the group consisting of polyvinyl formal, polyacrylate ester and polyvinylidene fluoride.

13. A nonaqueous electrolyte secondary battery comprising:
a cathode containing cathode active material and an anode containing anode active material, each active material capable of occluding and releasing lithium ions;
a nonaqueous electrolyte composition;
a separator; and
an outer package member for housing the anode, the cathode, the nonaqueous electrolyte composition and the separator, wherein the nonaqueous electrolyte composition includes:
an electrolyte salt;
a nonaqueous solvent; and
a compound having a phosphorus-hydrogen bond or a phosphorus-carbon bond,
wherein the compound having the phosphorus-hydrogen bond or phosphorus-carbon bond has hydrogen capable of being dissociated as a proton and is a phosphinic acid or an organic phosphinic acid.

14. The nonaqueous electrolyte secondary battery according to claim 13, wherein the outer package member is formed of a square can or a laminate film.

15. The nonaqueous electrolyte secondary battery according to claim 14, wherein the laminate film is a laminated aluminum film.

16. The nonaqueous electrolyte secondary battery according to claim 13, wherein the nonaqueous electrolyte composition is a gelatinous nonaqueous electrolyte composition.

17. A nonaqueous electrolyte composition comprising:
an electrolyte salt;
a nonaqueous solvent; and
a compound having a phosphorus-hydrogen bond selected from the group of compounds represented by the following formulae 3 and 4:

wherein any one of $X^4$, $X^5$ and $X^6$ represents H, and the remaining two of $X^4$, $X^5$ and $X^6$ each independently represent H, F, Cl, Br, OH or a salt O-M, wherein M represents Li, Na, K, Rb, Cs, $NH_4$, Mg, Ca, Sr, Ba, or a hydrocarbon group selected from $C_xH_{2x+1}$, $C_yH_{2y-1}$ or $C_zH_{2z-7}$ where x represents an integer from 1 to 4, y represents an integer from 2 to 4, and z represents an integer from 6 to 11.

18. A nonaqueous electrolyte composition comprising:
an electrolyte salt;
a nonaqueous solvent; and
a compound having a phosphorus-carbon bond selected from the group of compounds represented by the following formulae 12:

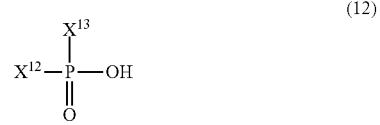

wherein any one of $X^{12}$ and $X^{13}$ represents a hydrocarbon group selected from $C_aH_{2a+1}$, $C_bH_{2b-1}$ or $C_cH_{2c-7}$ where a represents an integer from 1 to 4, b represents an integer from 2 to 4, and c represents an integer from 6 to 11, and the other of $X^{12}$ and $X^{13}$ represents H, F, Cl, Br, or a salt O-M, wherein M represents Li, Na, K, Rb, Cs, $NH_4$, Mg, Ca, Ba or a hydrocarbon group selected from $C_xH_{2x+1}$, $C_yH_{2y-1}$ or $C_zH_{2z-7}$ where x represents an integer from 1 to 4, y represents an integer from 2 to 4, and z represents an integer from 6 to 11.

\* \* \* \* \*